(12) United States Patent
Oohashi et al.

(10) Patent No.: US 7,508,196 B2
(45) Date of Patent: Mar. 24, 2009

(54) MAGNETIC SENSOR FOR POINTING DEVICE

(75) Inventors: Toshiyuki Oohashi, Kakegawa (JP); Yukio Wakui, Iwata (JP)

(73) Assignee: Yamaha Corporation, Shizuoka-Ken (JP)

( * ) Notice: Subject to any disclaimer, the term of this patent is extended or adjusted under 35 U.S.C. 154(b) by 72 days.

(21) Appl. No.: 11/391,579

(22) Filed: Mar. 28, 2006

(65) Prior Publication Data

US 2006/0261802 A1  Nov. 23, 2006

(30) Foreign Application Priority Data

Mar. 28, 2005 (JP) ............... 2005-091233

(51) Int. Cl.
*G01B 7/14* (2006.01)
*G01R 33/09* (2006.01)
*H01L 43/08* (2006.01)
*G01P 15/105* (2006.01)

(52) U.S. Cl. .............. 324/207.24; 324/207.21; 73/514.16

(58) Field of Classification Search .......... 324/207.11, 324/207.12, 207.2, 207.21, 207.23, 207.24, 324/207.25, 207.26, 252; 345/156, 157, 345/159, 161, 168, 184; 33/366.11, 366.12, 33/366.24, 366.27, 365; 73/514.17, 514.21, 73/514.22, 514.23, 514.36, 514.37
See application file for complete search history.

(56) References Cited

U.S. PATENT DOCUMENTS

| | | | | |
|---|---|---|---|---|
| 5,432,530 A | * | 7/1995 | Arita et al. .............. | 345/159 |
| 5,617,071 A | * | 4/1997 | Daughton .............. | 338/32 R |
| 5,929,631 A | * | 7/1999 | Striker et al. ........... | 324/207.21 |
| 6,605,085 B1 | * | 8/2003 | Edwards .............. | 606/41 |
| 6,640,652 B2 | * | 11/2003 | Kikuchi et al. ......... | 73/862.333 |
| 6,670,946 B2 | * | 12/2003 | Endo et al. ........... | 345/160 |
| 7,005,958 B2 | * | 2/2006 | Wan .............. | 338/32 R |
| 7,034,804 B2 | * | 4/2006 | Lai et al. ........... | 345/163 |
| 2002/0061735 A1 | | 5/2002 | Wingett et al. | |
| 2002/0142490 A1 | | 10/2002 | Sato et al. | |
| 2004/0080491 A1 | * | 4/2004 | Takatsuka et al. ......... | 345/156 |
| 2005/0200449 A1 | | 9/2005 | Hahn et al. | |

FOREIGN PATENT DOCUMENTS

| | | |
|---|---|---|
| CN | 1367481 | 9/2002 |
| CN | 1531679 | 9/2004 |
| JP | 04-238282 | 8/1992 |

(Continued)

*Primary Examiner*—Kenneth J Whittington
(74) *Attorney, Agent, or Firm*—Dickstein Shapiro LLP

(57) ABSTRACT

A magnetic sensor includes first through fourth GMR elements. The fixed layers of the first through fourth GMR elements have respective magnetization directions toward the X-axis positive, X-axis negative, Y-axis negative, and Y-axis positive directions. When a magnet is located at the initial position, the free layers of the first through fourth GMR elements have respective magnetization directions toward the Y-axis positive, Y-axis negative, X-axis negative, and X-axis positive directions. When the magnet is located at the initial position, the magnetization axis of the magnet passes through the centroid of the first through fourth GMR elements. The magnetic sensor detects, from the resistances of these GMR elements, changes in horizontal magnetic fields of the magnet which pass through the first through fourth GMR elements and which change in accordance with the moved position of the magnet, to thereby determine the position of the magnet.

19 Claims, 18 Drawing Sheets

FOREIGN PATENT DOCUMENTS

| | | |
|---|---|---|
| JP | 08-152961 | 6/1996 |
| JP | 2002-091697 | 3/2002 |
| JP | 2002-181505 | 6/2002 |
| JP | 2002-207568 | 7/2002 |
| JP | 2002-287891 | 10/2002 |
| JP | 2003-196019 A | 7/2003 |
| JP | 2003-308168 | 10/2003 |
| JP | 2004-069695 | 3/2004 |
| JP | 2004-070543 | 3/2004 |
| WO | WO-00/79298 A2 | 12/2000 |

\* cited by examiner

ORDINARY GMR ELEMENT
(ORDINARY SPIN VALVE FILM)

CHARACTERISTIC OF FIRST GIANT
MAGNETORESISTANCE ELEMENT 31

CHARACTERISTIC OF SECOND GIANT
MAGNETORESISTANCE ELEMENT 32

CHARACTERISTIC OF THIRD GIANT
MAGNETORESISTANCE ELEMENT 33

CHARACTERISTIC OF FOURTH GIANT
MAGNETORESISTANCE ELEMENT 34

(A)

(B)

MAGNETIC SENSOR FOR POINTING DEVICE

BACKGROUND OF THE INVENTION

1. Field of the Invention

The present invention relates to a magnetic sensor for a pointing device that detects the position of a magnet which is moved by an external operation force.

2. Description of the Related Art

As shown in FIG. 21, a conventionally known pointing device 100 includes a mounting substrate 101, a resin portion 102, a thin-disk-shaped magnet 103, and a magnetic sensor 110. The magnet 103 is supported above the mounting substrate 101 by means of the resin portion 102. When the magnet 103 receives no external operation force, it is located at a predetermined initial position. When the magnet 103 receives an external operation force, it moves with respect to the mounting substrate 101 in a direction parallel to a main face (X-Y plane) of the mounting substrate 101.

As shown in FIGS. 21 and 22, the magnetic sensor 110 includes a circuit board 111 and four Hall elements 112a, 112b, 112c, and 112d. The magnetic sensor 110 is fixed to the mounting substrate 101 to face the magnet 103 via the mounting substrate 101. Here, an axis which is parallel to a Z-axis direction and which passes through the centroid of the magnet 103 located at the initial position is considered to be the origin O of X and Y axes. The Hall element 112a and the Hall element 112c are disposed on the X-axis to be symmetric with respect to the Y-axis. The Hall element 112b and the Hall element 112d are disposed on the Y-axis to be symmetric with respect to the X-axis. The four Hall elements 112a, 112b, 112c, and 112d are spaced away from the origin O by the same distance.

The magnetic sensor 110 also includes a detection circuit as shown in FIG. 23. The detection circuit is formed on the circuit board 111. The detection circuit includes a differential amplifier 113a, a differential amplifier 113b, and a detection section 114. The differential amplifier 113a outputs a difference between voltages output from the Hall element 112a and the Hall element 112c. The differential amplifier 113b outputs a difference between voltages output from the Hall element 112b and the Hall element 112d. On the basis of the outputs of the differential amplifiers 113a and 113b, the detection section 114 outputs a signal which specifies the position of the magnet 103 (see, for example, Japanese Patent Application Laid-Open (kokai) No. 2003-196019).

In this pointing device 100, when the magnet 103 is located at the initial position, the respective distances between the magnet 103 and the four Hall elements 112a, 112b, 112c, and 112d are equal to one another. Therefore, the four Hall elements 112a, 112b, 112c, and 112d are equal to one another in terms of the density of magnetic flux passing therethrough in the Z-axis direction. As a result, all the Hall elements output the same voltage, so that the outputs of the differential amplifiers 113a and 113b both become zero. As a result, the detection section 114 outputs a signal indicating that the magnet 103 is located at the initial position.

Meanwhile, when the magnet 103 moves in the positive direction along the X-axis, the density of the magnetic flux passing through the Hall element 112c in the Z-axis direction becomes greater than that of the magnetic flux passing through the Hall element 112a in the Z-axis direction. Accordingly, the Hall element 112c outputs a higher voltage than does the Hall element 112a. As a result, the differential amplifier 113a outputs a positive voltage corresponding to the difference between the output voltage of the Hall element 112c and that of the Hall element 112a. The magnitude of this voltage increases as the magnet 103 approaches the Hall element 112c.

Meanwhile, the density of the magnetic flux passing through the Hall element 112b in the Z-axis direction and the density of the magnetic flux passing through the Hall element 112d in the Z-axis direction decrease by the same small amount as compared with the case where the magnet 103 is located at the initial position. Accordingly, the Hall element 112b and the Hall element 112d output the same voltage, so that the output of the differential amplifier 113b remains zero. As a result, the detection section 114 outputs a signal indicating that the magnet 103 has moved in the X-axis positive direction by a distance corresponding to the output voltage of the differential amplifier 113a. As described above, the magnetic sensor 110 is configured to detect the position of the magnet 103 by detecting the vertical component of a magnetic field generated by the magnet 103 (a magnetic field component parallel to a straight line connecting the magnetization center of one magnetic pole of the magnet 103 and the magnetization center of the other magnetic pole thereof; in this case, a magnetic field along the Z-axis direction). Notably, a straight line connecting the magnetization center of one magnetic pole of a magnet and the magnetization center of the other magnetic pole thereof will be also referred to as a "magnetization axis."

However, such a pointing device 100 has a drawback in that considerable restrictions are imposed on the size of the magnet 103, the positions of arrangement of the Hall elements 112a, 112b, 112c, and 112d, and the distances therebetween. This drawback will be described with reference to FIGS. 24 and 25, while the case where the magnet moves in the X-axis positive direction is taken as an example. FIG. 24 is a schematic view showing a state in which the magnet 103 is located at the initial position. FIG. 25 is a schematic view showing a state in which the magnet 103 has moved to a position at which the magnetization axis of the magnet 103 passes through the center of the Hall element 112c (hereinafter referred to as "detection limit position").

As can be understood from FIGS. 24 and 25, during a period in which the magnet 103 moves from the initial position shown in FIG. 24 to the detection limit position shown in FIG. 25, the density of magnetic lines of force (magnetic flux) of the vertical magnetic field passing through the Hall element 112a gradually decreases and the density of magnetic lines of force of the vertical magnetic field passing through the Hall element 112c gradually increases, as the magnet 103 moves in the X-axis positive direction.

However, when the magnet 103 reaches the vicinity of the detection limit position shown in FIG. 25, the vertical magnetic field hardly acts on the Hall element 112a. Therefore, even when the magnet 103 moves further in the X-axis positive direction beyond the detection limit position shown in FIG. 25, the output of the Hall element 112a hardly changes. Meanwhile, when the magnet 103 moves further in the X-axis positive direction beyond the detection limit position shown in FIG. 25, the density of magnetic lines of force of the vertical magnetic field passing through the Hall element 112c starts to decrease. As a result, the magnetic sensor 110 outputs the same value for both the case where the magnet is a short distance away from the detection limit position in the X-axis positive direction and the case where the magnet is a short distance away from the detection limit position in the X-axis negative direction.

Accordingly, in the conventional pointing device 100, a range along the X-axis direction in which the magnetic 103 is movable (an X-axis range in which the position of the magnet 103 is detectable) is restricted between the Hall element 112*a* and the Hall element 112*c*. Therefore, it is impossible to provide a pointing device in which the magnet 103 can be moved over a large distance. This problem can be solved by increasing the distance between the Hall element 112*a* and the Hall element 112*c*. In this case, however, the size of the magnet 103 increases, due to the necessity of applying sufficient vertical magnetic fields to the respective Hall elements, and/or the distance between the magnet 103 and the mounting substrate 101 increases. As a result, there arises a problem of an increase in the sizes of the magnetic sensor 110 and the pointing device 100.

SUMMARY OF THE INVENTION

The present invention has been accomplished so as to cope with the above-described problems, and an object of the present invention is to provide a magnetic sensor for a pointing device which lessens the restriction on the layout of a magnet and elements and which can accurately detect the position of the magnet.

The present invention provides a magnetic sensor for a pointing device which detects a position of a magnet supported on a mounting substrate such that when an external operation force is applied to the magnet, the magnet moves from a predetermined initial position, the movement including a component parallel to a main surface of the substrate, wherein a straight line connecting the magnetization center of one magnetic pole of the magnet and the magnetization center of the other magnetic pole thereof perpendicularly intersects the main surface of the mounting substrate when the magnet is located at the initial position, the magnetic sensor comprising one giant magnetoresistance element fixedly secured to the mounting substrate such that the layer plane of a fixed layer thereof is parallel to the main surface of the mounting substrate, and the magnetization direction of the fixed layer coincides with a predetermined first direction; and Another giant magnetoresistance element fixedly secured to the mounting substrate such that the layer plane of a fixed layer thereof is parallel to the main surface of the mounting substrate, and the magnetization direction of the fixed layer coincides with a direction different from the first direction (preferably, a direction which is not parallel or antiparallel to the first direction and which intersects the first direction). The position of the magnet is detected on the basis of resistances of the two giant magnetoresistance elements.

With this configuration, when the magnet is located at the initial position, a straight line connecting the magnetization center of one magnetic pole of the magnet and the magnetization center of the other magnetic pole thereof (e.g., a magnetization axis, which is a straight line parallel to the Z-axis direction), perpendicularly intersects the main surface of the mounting substrate (e.g., a plane parallel to the X-Y plane). Magnetic fields (magnetic lines of force; magnetic flux) generated by the magnet extend radially from the center of magnetization of the magnet around the magnetization axis (see FIG. 4). For example, when the magnet assumes the form of a disk, the magnetic fields (magnetic lines of force; magnetic flux) generated by the magnet extend radially from the center of the bottom or top surface of the disk around the axis of the magnet. Further, in response to an operation force, the magnet moves, and the movement involves a component parallel to a main surface of the substrate (e.g., a component parallel to the X-axis direction and/or a component parallel to the Y-axis direction).

As shown in FIGS. 1 and 13, one giant magnetoresistance element GMR1 (31) is fixedly secured to the mounting substrate such that the layer plane of a fixed layer thereof is parallel to the main surface of the mounting substrate, and the magnetization direction of the fixed layer coincides with a predetermined first direction (e.g., the X-axis positive direction). The other giant magnetoresistance element GMR3 (33) is fixedly secured to the mounting substrate such that the layer plane of a fixed layer thereof is parallel to the main surface of the mounting substrate, and the magnetization direction of the fixed layer coincides with a direction (e.g., the Y-axis negative direction) different from (intersecting) the first direction. Since the layer planes of the fixed layer, free layer, etc. of each of the giant magnetoresistance elements are parallel to horizontal magnetic fields generated by the magnet Mg (magnetic fields extending in a plane perpendicular to the magnetization axis), the magnetization direction of the free layer changes in accordance with the horizontal magnetic fields.

Accordingly, when the magnet Mg moves in a plane (X-Y plane) parallel to the main surface of the mounting substrate, there arise changes in the directions of magnetic fields (horizontal magnetic fields generated by the magnet Mg) which are applied to the giant magnetoresistance elements GMR1 and GMR3 in the plane parallel to the main surface of the mounting substrate.

With the changes, the magnetization direction of the free layer of the giant magnetoresistance element GMR1 changes to coincide with the direction of the corresponding horizontal magnetic field generated by the magnet Mg, and thus, the angle formed between the magnetization direction of the fixed layer of the giant magnetoresistance element GMR1 and the magnetization direction of the free layer thereof changes to a predetermined angle $\alpha 1$. As a result, the resistance R1 of the giant magnetoresistance element GMR1 changes. Similarly, the magnetization direction of the free layer of the giant magnetoresistance element GMR3 changes to coincide with the direction of the corresponding horizontal magnetic field generated by the magnet Mg, and thus, the angle formed between the magnetization direction of the fixed layer of the giant magnetoresistance element GMR3 and the magnetization direction of the free layer thereof changes to a predetermined angle $\alpha 2$. As a result, the resistance R3 of the giant magnetoresistance element GMR3 changes.

In this case, as is apparent from the examples shown in FIGS. 1 and 13, a combination ($\alpha 1$, $\alpha 2$) of angles $\alpha 1$ and $\alpha 2$ is peculiar to a certain position of the magnet Mg. Meanwhile, each giant magnetoresistance element exhibits a resistance which changes in accordance with the angle formed between the magnetization direction of the fixed layer and the magnetization direction of the free layer. Accordingly, a combination (R1, R3) of resistances R1 and R3 of the giant magnetoresistance elements GMR1 and GMR3 is peculiar to a certain position of the magnet Mg. Accordingly, the position of the magnet Mg can be detected from the combination of the resistances R1 and R3.

As described above, the magnetic sensor of the present invention detects horizontal magnetic fields which the magnet Mg generates by means of the giant magnetoresistance elements. The horizontal magnetic fields generated by the magnet Mg extend over a wider range than do the vertical magnetic fields generated by the magnet Mg. Further, the sensitivities of the giant magnetoresistance elements are very high. Therefore, even when the distances between the magnet Mg and the giant magnetoresistance elements increase, the position of the magnet Mg can be detected. By virtue of the above-described features, there can be provided a magnetic sensor for a pointing device which has a reduced restriction on the layout of the magnet and the elements.

The present invention provides another magnetic sensor for a pointing device which detects a position of a magnet supported on a mounting substrate such that when an external operation force is applied to the magnet, the magnet moves from a predetermined initial position, the movement including a component parallel to a main surface of the substrate, wherein a straight line connecting the magnetization center of one magnetic pole of the magnet and the magnetization center of the other magnetic pole thereof perpendicularly intersects the main surface of the mounting substrate when the magnet is located at the initial position, the magnetic sensor comprising first through fourth giant magnetoresistance elements, wherein the position of the magnet is detected on the basis of resistances of the first through fourth giant magnetoresistance elements.

As shown in, for example, section (A) of FIG. 1 and FIG. 13, the first giant magnetoresistance element GMR1 (31) is fixedly secured to the mounting substrate such that the layer plane of a fixed layer thereof is parallel to the main surface of the mounting substrate, and the magnetization direction of the fixed layer coincides with a predetermined first direction (e.g., the X-axis positive direction), and is configured such that when the magnet is located at the initial position, the magnetization direction of a free layer of the element coincides with a direction (e.g. Y-axis positive direction) which differs from the first direction by 90 degrees.

The second giant magnetoresistance element GMR2 (32) is fixedly secured to the mounting substrate such that the layer plane of a fixed layer thereof is parallel to the main surface of the mounting substrate, and the magnetization direction of the fixed layer coincides with a second direction (e.g., the X-axis negative direction), which is opposite to the first direction (i.e., which differs from the first direction by 180 degrees), and is configured such that when the magnet is located at the initial position, the magnetization direction of a free layer of the element coincides with a direction (e.g. Y-axis negative direction) which differs from the second direction by 90 degrees.

Accordingly, as shown in FIG. 1, when the magnet Mg moves in a plane (X-Y plane) parallel to the main surface of the mounting substrate in a direction (in this case, in the X-axis direction) perpendicular to a straight line connecting the first and second giant magnetoresistance elements GMR1 and GMR2 (in the example of FIG. 1, a straight line parallel to the Y-axis), there arise changes in the directions of horizontal magnetic fields generated by the magnet Mg which are applied to the first and second giant magnetoresistance elements GMR1 and GMR2 in the plane parallel to the main surface of the mounting substrate.

With the changes, the magnetization direction of the free layer of the first giant magnetoresistance element GMR1 changes to coincide with the direction of the corresponding horizontal magnetic field generated by the magnet Mg, and thus, the angle formed between the magnetization direction of the fixed layer of the first giant magnetoresistance element GMR1 and the magnetization direction of the free layer thereof changes to a predetermined angle θ1. As a result, the resistance R1 of the first giant magnetoresistance element GMR1 changes. Similarly, the magnetization direction of the free layer of the second giant magnetoresistance element GMR2 changes to coincide with the direction of the corresponding horizontal magnetic field generated by the magnet Mg, and thus, the angle formed between the magnetization direction of the fixed layer of the second giant magnetoresistance element GMR2 and the magnetization direction of the free layer thereof changes to a predetermined angle θ2. As a result, the resistance R2 of the second giant magnetoresistance element GMR2 changes.

In this case, as is apparent from the examples shown in FIG. 1, when the angle θ1 formed between the magnetization direction of the fixed layer of the first giant magnetoresistance element GMR1 and the magnetization direction of the free layer thereof is an obtuse angle, the angle θ2 formed between the magnetization direction of the fixed layer of the second giant magnetoresistance element GMR2 and the magnetization direction of the free layer thereof becomes an acute angle. Accordingly, from the relation of magnitude between the resistance of the first giant magnetoresistance element GMR1 and the resistance of the second giant magnetoresistance element GMR2, a determination can be made as to whether the magnet Mg has moved in the X-axis positive direction or the X-axis negative direction, and the moving distance can be determined from their resistances.

Further, as is apparent from the examples shown in FIG. 1, as the the moving distance of the magnet Mg from the initial position along the X-axis direction becomes greater, the magnetization directions of the fixed layer and the free layer of one of the first and second giant magnetoresistance element GMR1 and GMR2 become closer to being antiparallel (180 degree angle difference) to each other. Accordingly, the resistance of one of the elements approaches the maximum value. Meanwhile, as the moving distance of the magnet Mg becomes greater, the magnetization directions of the fixed layer and the free layer of the other element come closer to being parallel (0 degree angle difference) to each other. Accordingly, the resistance of the other element approaches the minimum value.

This stands even after the magnetization axis of the magnet has moved greatly (see sections (B) and (C) of FIG. 1 or sections (D) and (E) of FIG. 1). Accordingly, the restrictions on the arrangement, size, distance, etc. of the magnet Mg and the first and second giant magnetoresistance elements GMR1 and GMR2 are very small.

As shown in, for example, section (A) of FIG. 1 and FIG. 13, the third giant magnetoresistance element GMR3 (33) is fixedly secured to the mounting substrate such that the layer plane of a fixed layer thereof is parallel to the main surface of the mounting substrate, and the magnetization direction of the fixed layer coincides with a third direction (e.g., the Y-axis negative direction) which differs from the first direction by 90 degrees, and is configured such that when the magnet is located at the initial position, the magnetization direction of a free layer of the element coincides with a direction (e.g. X-axis negative direction) which differs from the third direction by 90 degrees.

The fourth giant magnetoresistance element GMR4 (34) is fixedly secured to the mounting substrate such that the layer plane of a fixed layer thereof is parallel to the main surface of the mounting substrate, and the magnetization direction of the fixed layer coincides with a fourth direction (e.g., the Y-axis positive direction), which is opposite the third direction (i.e., which differs from the third direction by 180 degrees), and is configured such that when the magnet is located at the initial position, the magnetization direction of a free layer of the element coincides with a direction (e.g. X-axis positive direction) which differs the fourth direction by 90 degrees.

Accordingly, when the magnet Mg moves in the Y-axis direction, the magnetization direction of the free layer of the third giant magnetoresistance element GMR3 and the magnetization direction of the free layer of the fourth giant magnetoresistance element GMR4 change in the same manner (see FIG. 13). As a result, the resistances R3 and R4 of the third and fourth giant magnetoresistance elements change in accordance with the position of the magnet Mg along the Y-axis direction. In other words, the combination of resistances R1, R2, R3, and R4 of the first through fourth giant magnetoresistance elements GMR1 to GMR4 is peculiar to the position of the magnetic Mg. Thus, the magnetic sensor of the present invention detects the position of the magnet Mg on the basis of the respective resistances of the first through fourth giant magnetoresistance elements GMR1 to GMR4.

As described above, the magnetic sensor of the present invention detects horizontal magnetic fields which the magnet Mg generates, by means of the first through fourth giant magnetoresistance elements. The horizontal magnetic fields generated by the magnet Mg extend over a wider range than do the vertical magnetic fields generated by the magnet Mg. Further, the sensitivities of the giant magnetoresistance elements are very high. Therefore, even when the distances between the magnet Mg and the giant magnetoresistance elements increase, the position of the magnet Mg can be detected. In addition, even when the magnetization axis of the magnet has moved greatly, the giant magnetoresistance elements exhibit resistances peculiar to the position of the magnet.

By virtue of the above-described features, there can be provided a magnetic sensor for a pointing device which has a reduced restriction on the arrangement, size, distance, etc. of the magnet Mg and the first through fourth giant magnetoresistance elements.

In the case of this magnetic sensor, preferably, the first through fourth giant magnetoresistance elements are formed on a single substrate. This enables further reduction of the size of the magnetic sensor.

Preferably, the first through fourth giant magnetoresistance elements are disposed at corner portions of a single rhombus (more preferably, a square); a line connecting the first giant magnetoresistance element and the second giant magnetoresistance element forms one diagonal of the rhombus; and a line connecting the third giant magnetoresistance element and the fourth giant magnetoresistance element forms the other diagonal of the rhombus.

In addition, preferably, when the magnet is located at the initial position, a straight line (magnetization axis) which connects the magnetization center of one magnetic pole of the magnet and the magnetization center of the other magnetic pole thereof passes through the centroid of the square. This enables the giant magnetoresistance elements to be disposed such that the magnet of the pointing device functions as a bias magnetic film for returning the magnetization directions of the free layers to their initial magnetization directions. In this case, the bias magnetic film can be omitted so as to lower the cost of the magnetic sensor.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENTS

Embodiments of a magnetic sensor for a pointing device according to the present invention will next be described in detail with reference to the drawings.

<Structure>

Figure 1:
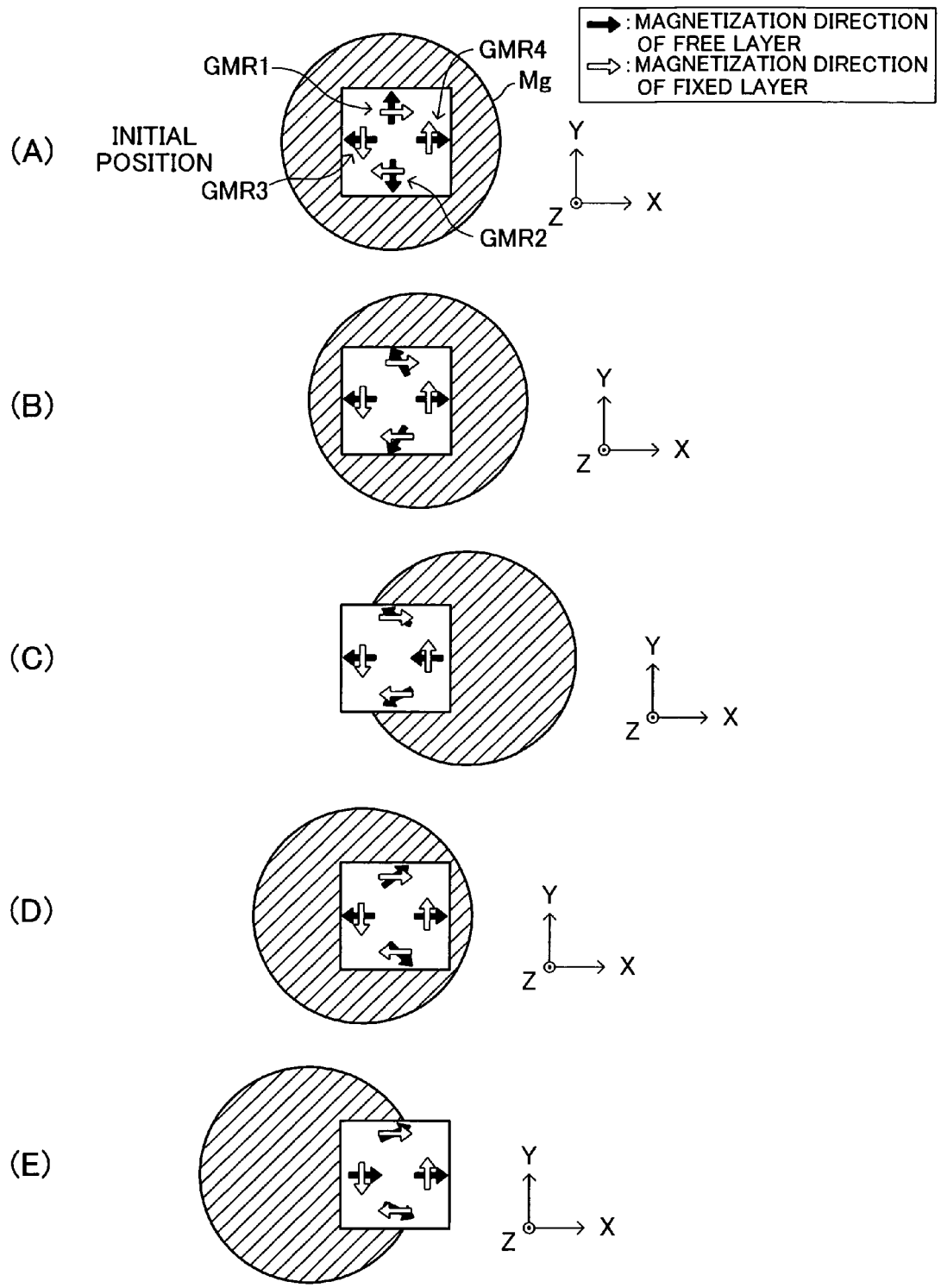
FIG. 1 is a plan view used for explaining general operation of a magnetic sensor according to an embodiment of the present invention.
Figure 2:
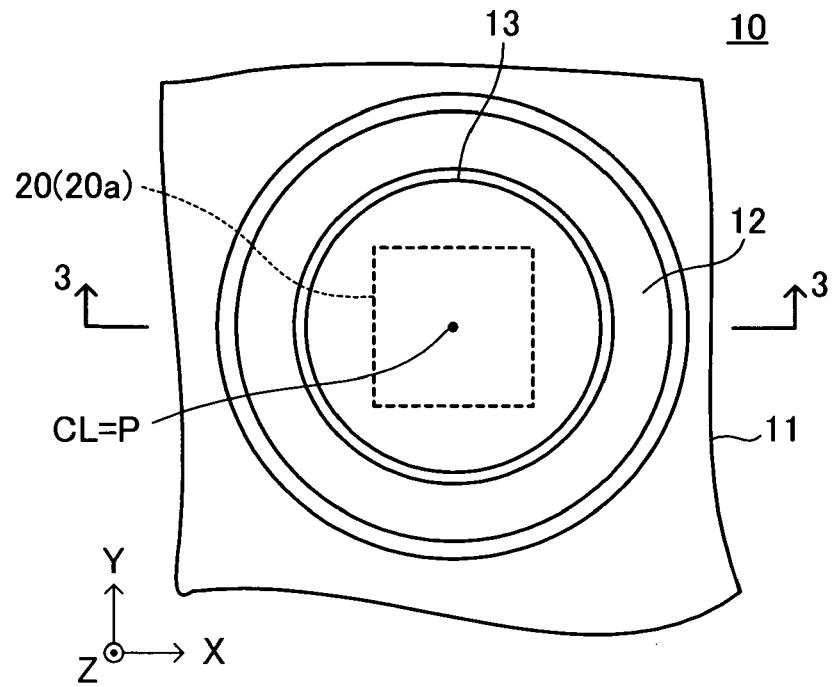
FIG. 2 is a plan view of a pointing device to which the magnetic sensor according to the embodiment of the present invention is applied.
Figure 3:
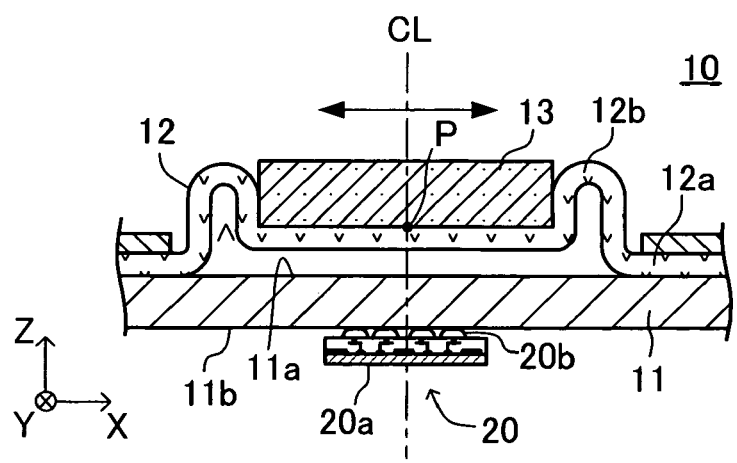
FIG. 3 is a sectional view of the pointing device taken along line 3-3 of FIG. 2.

FIG. 2 is a plan view of a pointing device 10 to which the magnetic sensor according to the present invention is applied. FIG. 3 is a sectional view of the pointing device 10 taken along line 3-3 of FIG. 2.

The pointing device 10 is used, for example, as an input device (cursor-moving device) of a cellular phone. The pointing device 10 includes a mounting substrate 11, a resin portion 12, a thin-disk-shaped magnet 13, and a magnetic sensor 20.

The mounting substrate 11 is a plate member, and has a main surface 11a parallel to an X-Y plane in an X-Y-Z orthogonal coordinate system and a lower surface 11b parallel to the main surface 11a. Unillustrated printed wiring is formed on the lower surface 11b of the mounting substrate 11.

The resin portion 12 includes a fixing portion 12a and a holding portion 12b. The fixing portion 12a is fixedly bonded to the mounting substrate 11. The holding portion 12b assumes a generally cylindrical shape. The resin portion 12 holds the magnet 13 such that the magnet 13 is accommodated in a recess formed on the top surface of the holding portion 12b. A space is formed between the mounting substrate 11 and the holding portion 12b. With this configuration, the resin portion 12 holds the magnet 13 such that when no external operation force is applied to the magnet 13, the magnet 13 is maintained at an initial position shown in FIGS. 2 and 3, and when an external operation force is applied to the magnet 13, the resin portion 12 smoothly deforms to move the magnet 13 with respect to the mounting substrate 11. Accordingly, depending on the direction of the external operation force, the movement of the magnet 13 may include components parallel to the main surface 11a of the mounting substrate 11 (i.e., an X-axis direction component and a Y-axis direction component) and a component perpendicular to the main surface 11a (i.e., a Z-axis direction component).

Figure 4:
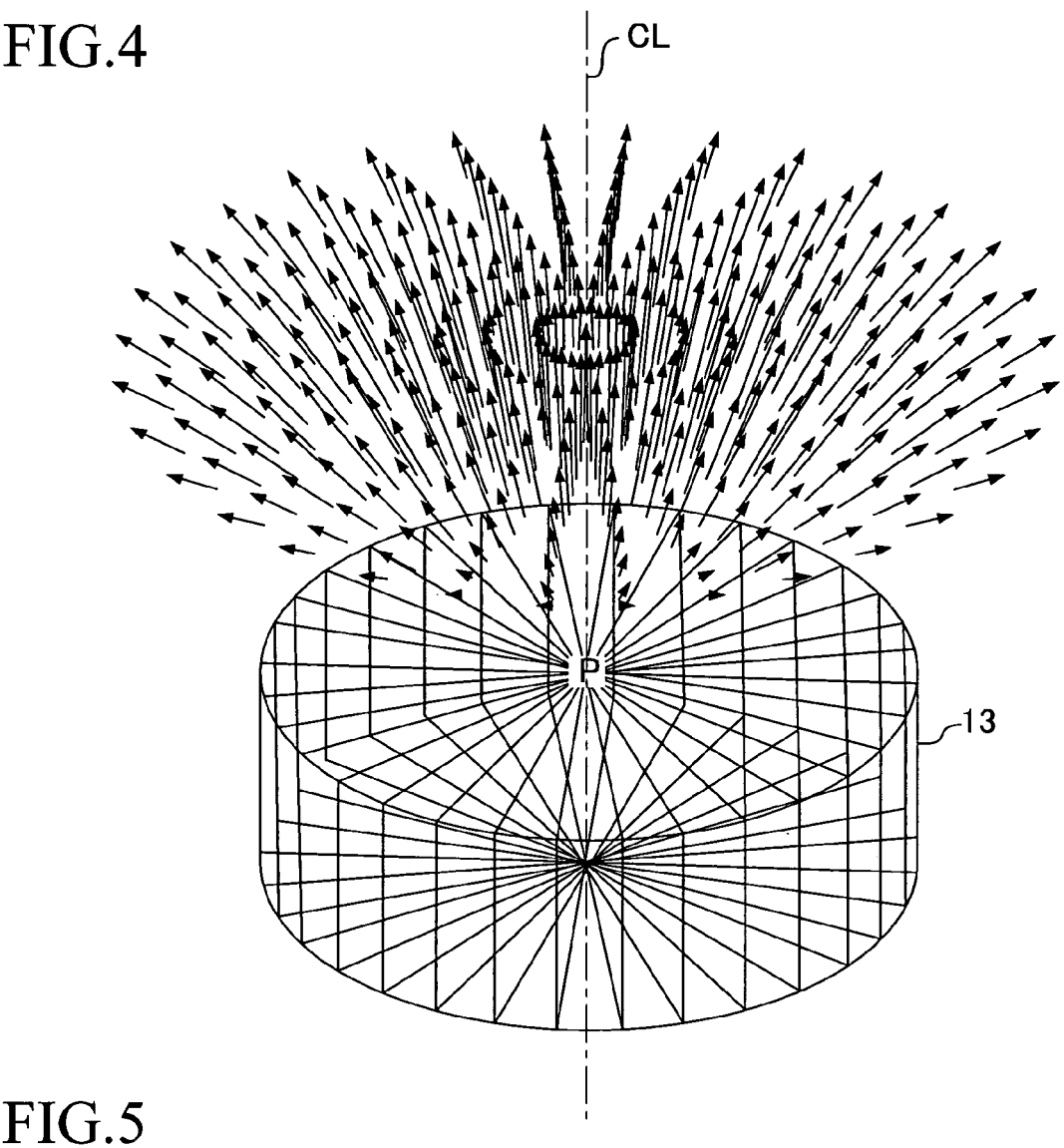
FIG. 4 is a perspective view of the magnet shown in FIG. 2, showing magnetic lines of force of magnetic fields generated by the magnet.

The magnet 13 is formed of a hard ferromagnetic material, and is magnetized in such a manner that the magnetization axis coincides with the center axis of the disk shape. As shown in FIG. 4, magnetic fields (magnetic lines of force; magnetic flux) generated by the magnet 13 extend radially from the center P of magnetization of the magnet 13 around the center axis (magnetization axis) of the magnet 13. Since the magnet 13 assumes a disk-like shape, the magnetization center P coincides with the respective centers of the bottom and upper surfaces of the magnet 13. The magnet 13 is disposed such that an end portion toward the Z-axis negative direction (i.e., an end surface facing the magnetic sensor 20) serves as an N pole.

The magnetic sensor 20 includes a body 20a and a plurality of projecting electrodes 20b. The body 20a is fixed to the lower surface 11b of the mounting substrate 11 by means of the projecting electrodes 20b such that the body 20a faces the magnet 13 via the mounting substrate 11 when the magnet 13 is located at the initial position. The body 20a is a thin plate member, and when fixed to the mounting substrate 11, the body 20a has a square shape having sides along the X-axis and the Y-axis as viewed from above as shown in FIG. 2, and has a small thickness in the Z-axis direction as shown in FIG. 3. The projecting electrodes 20b are electrically connected to unillustrated printed wiring formed on the lower surface of the mounting substrate 11.

Figure 5:
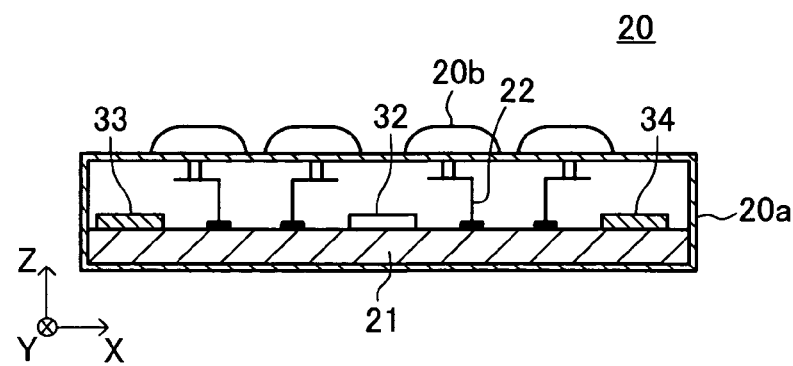
FIG. 5 is an enlarged sectional view of the magnetic sensor shown in FIG. 3.
Figure 6:
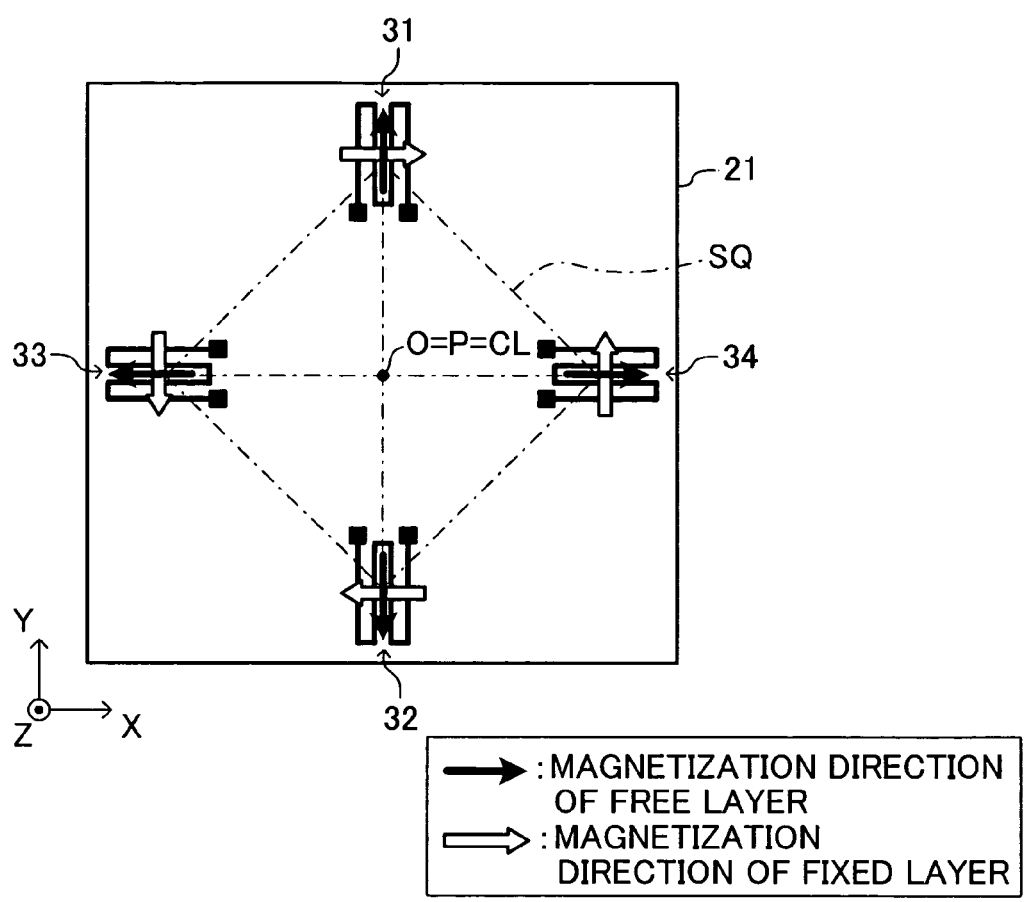
FIG. 6 is an enlarged plan view of the substrate of the magnetic sensor shown in FIG. 3.
Figure 11:
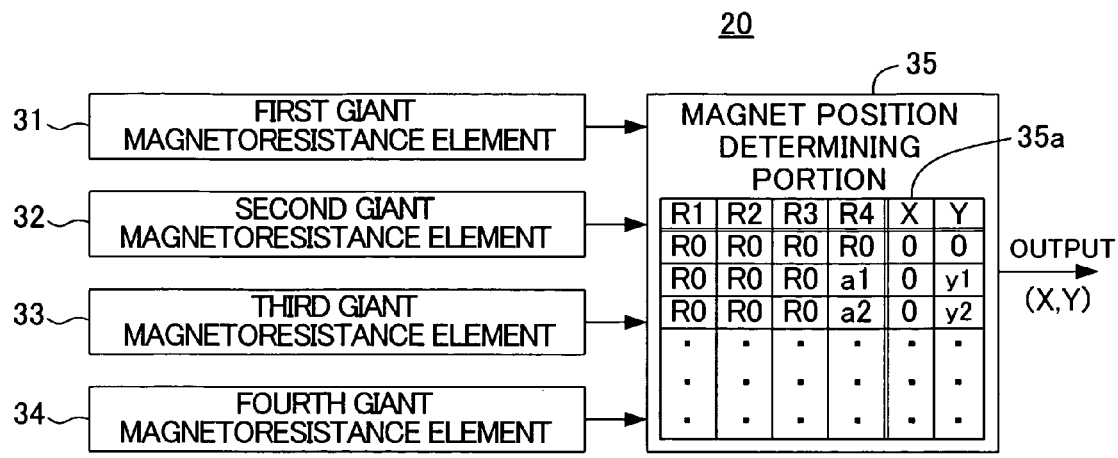
FIG. 11 is a circuit block diagram of the magnetic sensor shown in FIG. 3.

As shown in FIG. 5 and 6, the body 20a includes a substrate 21, connection wires 22, a first giant magnetoresistance element 31, a second giant magnetoresistance element 32, a third giant magnetoresistance element 33, a fourth giant magnetoresistance element 34, and a magnet position determining portion (position determining section) 35 (see FIG. 11).

The substrate 21 is a single (monolithic) substrate formed of silicon. The substrate 21 is a thin plate member, and when the magnetic sensor 20 is fixed to the mounting substrate 11, the substrate 21 has a square shape having sides along the X-axis and the Y-axis as viewed from above, and has a small thickness in the Z-axis direction. An unillustrated IC circuit and an unillustrated wiring layer, including the above-mentioned magnet position determining portion 35, are formed inside the substrate 21. The terminals of the IC circuit and the wiring layer are electrically connected to the projecting electrodes 20b by means of the connection wires 22.

The first giant magnetoresistance element 31, the second giant magnetoresistance element 32, the third giant magnetoresistance element 33, and the fourth giant magnetoresistance element 34 are formed on the main surface (upper surface) of the substrate 21. The first giant magnetoresistance element 31 is disposed on the substrate 21 to be located near an end thereof toward the Y-axis positive direction and is located at the center thereof with respect to the X-axis direction. The second giant magnetoresistance element 32 is disposed on the substrate 21 to be located near an end thereof toward the Y-axis negative direction and is located at the center thereof with respect to the X-axis direction. The third giant magnetoresistance element 33 is disposed on the substrate 21 to be located near an end thereof toward the X-axis negative direction and is located at the center thereof with respect to the Y-axis direction. The fourth giant magnetoresistance element 34 is disposed on the substrate 21 to be located near an end thereof toward the X-axis positive direction and is located at the center thereof with respect to the Y-axis direction.

That is, the first through fourth giant magnetoresistance elements 31 to 34 are disposed at respective corner portions of a single rhombus (in this case, a square) SQ. Accordingly, a line connecting the first giant magnetoresistance element 31 and the second giant magnetoresistance element 32 forms one diagonal of the rhombus SQ, and a line connecting the third giant magnetoresistance element 33 and the fourth giant magnetoresistance element 34 forms the other diagonal of the rhombus SQ. The magnet 13 and the magnetic sensor 20 are disposed with respect to each other in such a manner that in a state in which the magnetic sensor 20 is fixed to the mounting substrate 11 and the magnet 13 is located at the initial position, a straight line connecting the magnetization center of one magnetic pole of the magnet 13 and the magnetization center of the other magnetic pole thereof (i.e., the magnetization axis) passes through the centroid O of the rhombus (square) SQ. This centroid O serves as the origin O for the X-axis and the Y-axis for representing the position of the magnet 13.

The first through fourth giant magnetoresistance elements 31 to 34 have the same structure, except for their positions on the substrate 21, their orientations, the fixed magnetization directions of their fixed layers, and the magnetization directions of their free layers in the initial state. Accordingly, in the following description, the first giant magnetoresistance element 31 will be described as a representative with reference to FIGS. 7 to 9.

Figure 7:
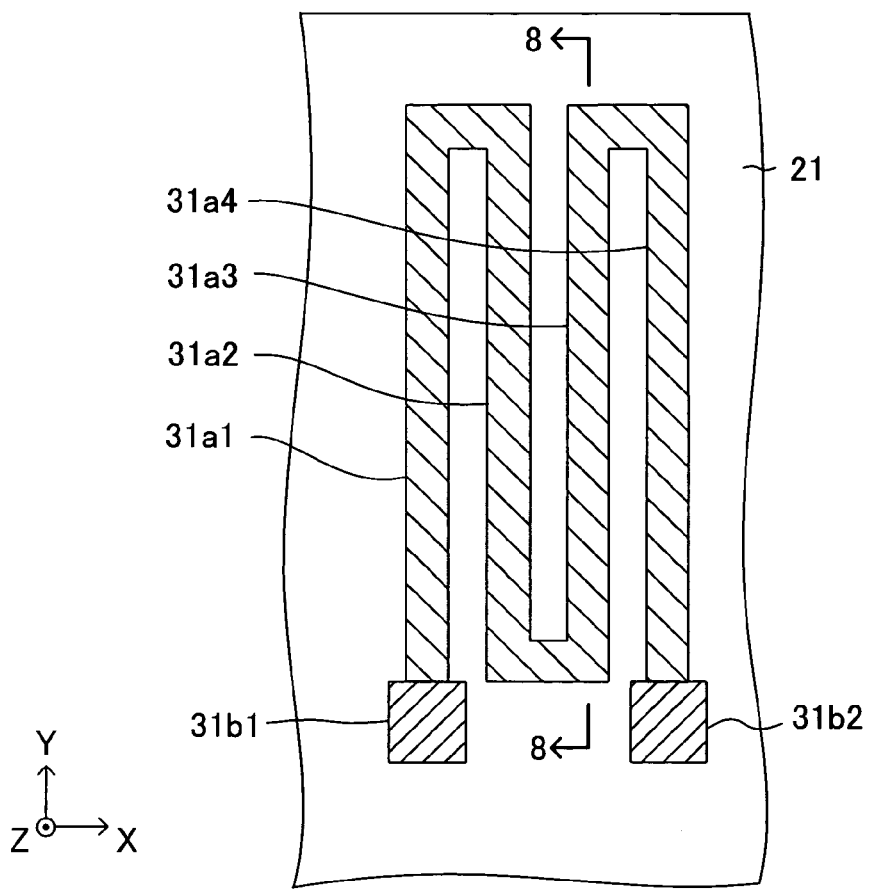
FIG. 7 is an enlarged plan view of the first giant magnetoresistance element shown in FIG. 6.
Figure 8:
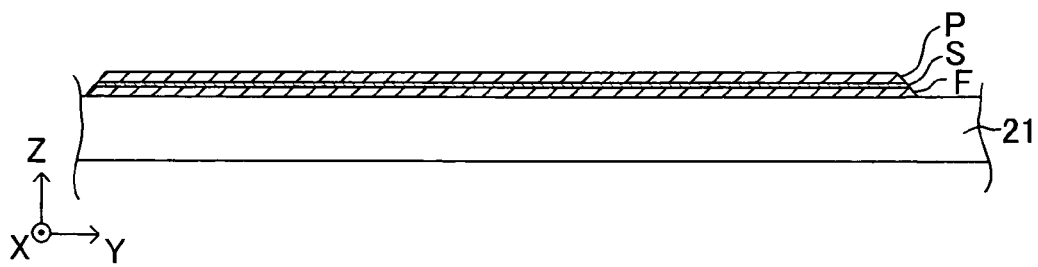
FIG. 8 is a schematic sectional view of the first giant magnetoresistance element taken along line 8-8 of FIG. 7.

As shown in FIG. 7, which is an enlarged plan view of the first giant magnetoresistance element 31, and FIG. 8, which is a schematic sectional view of the first giant magnetoresistance element 31 taken along line 8-8 of FIG. 7, the first giant magnetoresistance element 31 includes a plurality of (four, in this example) narrow strip portions 31a1 to 31a4, and a pair of terminal portions 31b1 and 31b2.

The narrow strip portions 31a1 to 31a4 extend parallel to the Y-axis direction. The outer narrow strip portion 31a1 located on the side toward the X-axis negative direction is connected to the terminal portion 31b1 via its end portion located on the side toward the Y-axis negative direction. The other end of the narrow strip portion 31a1 located on the side toward the Y-axis positive direction is bent to extend toward the X-axis positive direction, and is connected to one end of the narrow strip portion 31a2 located on the side toward the Y-axis positive direction. The other end of the narrow strip portion 31a2 located on the side toward the Y-axis negative direction is bent to extend toward the X-axis positive direction, and is connected to one end of the narrow strip portion 31a3 located on the side toward the Y-axis negative direction. The other end of the narrow strip portion 31a3 located on the side toward the Y-axis positive direction is bent to extend toward the X-axis positive direction, and is connected to one end of the narrow strip portion 31a4 located on the side toward the Y-axis positive direction. The other end of the narrow strip portion 31a4 located on the side toward the Y-axis negative direction is connected to the terminal portion 31b2. As described above, the first giant magnetoresistance element 31 is an element in which a plurality of narrow strip portions are arranged in a zigzag pattern and are connected in series.

Figure 9A:
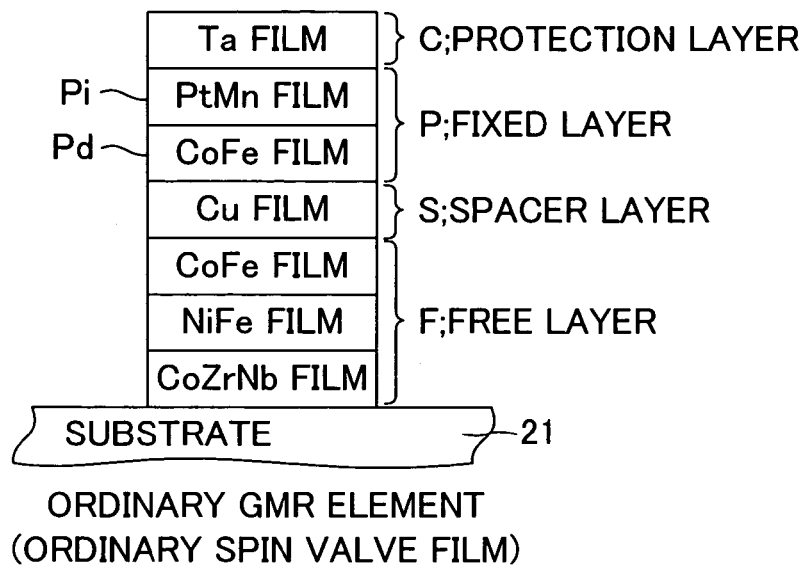
FIG. 9A is an illustration showing the layer structure of the first giant magnetoresistance element shown in FIG. 6.

Each of the narrow strip portions 31a1 to 31a4 is formed of a spin valve film having a layer structure as shown in FIG. 9A. The spin valve film includes a free layer F formed on the substrate 21, a spacer layer S formed on the free layer F, a fixed layer P formed on the spacer layer S, and a protection layer (capping layer) C formed on the fixed layer P. In actuality, an unillustrated insulating-wiring layer formed of $SiO_2$ or SiN is formed between the upper surface of the substrate 21 and the free layer F.

The free layer F is a layer whose magnetization direction changes in accordance with the direction of an external magnetic field. The free layer F includes a CoZrNb amorphous magnetic layer formed directly on the substrate 21, an NiFe magnetic layer formed on the CoZrNb amorphous magnetic layer, and a CoFe layer formed on the NiFe magnetic layer. These layers constitute a soft ferromagnetic film.

Since the narrow strip portions 31a1 to 31a4 extend parallel to the Y-axis direction, the free layer F extends parallel to the Y-axis direction. Accordingly, when no external magnetic field is applied to the free layer F, because of shape anisotropy, the magnetization direction of the free layer F (hereafter referred to as the "magnetization direction in the initial state") coincides with the longitudinal direction of the free layer F (Y-axis positive direction in the case of the first giant magnetoresistance element 31).

The spacer layer S is a film formed of a non-magnetic, electrically conductive material (Cu in the present example).

The fixed layer (magnetization-fixed layer) P is a single fixed layer which includes a CoFe magnetic layer (ferromagnetic film) Pd; and an antiferromagnetic film Pi formed of a PtMn alloy that contains Pt in an amount of 45 mol % to 55 mol % and layered on the CoFe magnetic layer Pd. The CoFe magnetic layer Pd constitutes a pinned layer Pd which is lined with the antiferromagnetic film (pinning layer) Pi in an exchange coupling condition, and whose magnetization (magnetization vector) direction is pinned (fixed) in the X-axis positive direction. The magnetization direction of the CoFe magnetic layer Pd is the fixed magnetization direction of the fixed layer (pined layer) of each giant magnetoresistance element.

The protection layer C is formed of titanium (Ti) or tantalum (Ta).

Figure 9B:
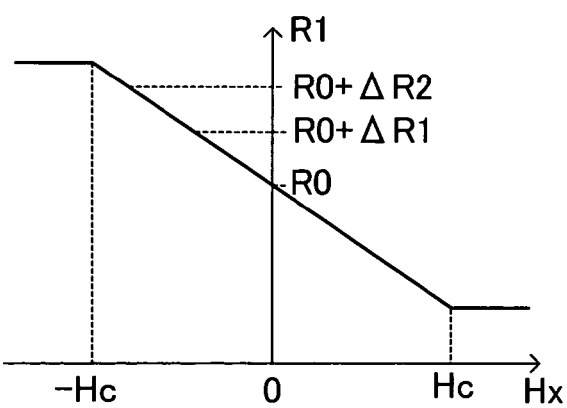
FIG. 9B is a graph showing change in resistance of the first giant magnetoresistance element with external magnetic field.

With the above-described configuration, the resistance of the first giant magnetoresistance element 31 can be obtained from the terminal portions 31b1 and 31b2 as the sum of respective resistances of the narrow strip portions 31a1 to 31a4. As a result, as shown in FIG. 9B, in the range of −Hc to +Hc, the first giant magnetoresistance element 31 has a resistance R1 which changes with the component Hx of an external magnetic field in the fixed magnetization direction of the CoFe magnetic layer Pd of the fixed layer P (in this case, the X-axis positive direction); i.e., a resistance which decreases as the intensity of the external magnetic field in the X-axis positive direction increases.

Referring back to FIG. 6, the fixed layer of the second giant magnetoresistance element 32 is magnetized in the X-axis negative direction, and the magnetization direction of the free layer of the second giant magnetoresistance element 32 in the initial state is the Y-axis negative direction. The fixed layer of the third giant magnetoresistance element 33 is magnetized in the Y-axis negative direction, and the magnetization direction of the free layer of the third giant magnetoresistance element 33 in the initial state is the X-axis negative direction. The fixed layer of the fourth giant magnetoresistance element 34 is magnetized in the Y-axis positive direction, and the magnetization direction of the free layer of the fourth giant magnetoresistance element 34 in the initial state is the X-axis positive direction.

Figure 10A:
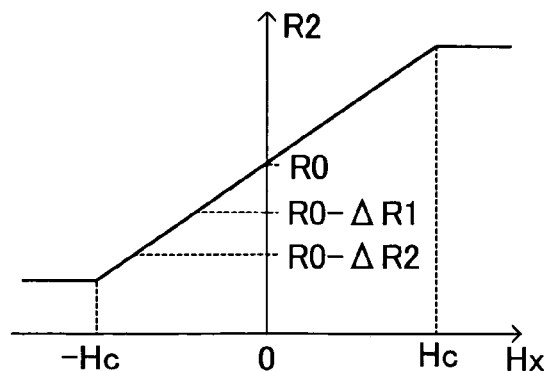
FIG. 10A is a graph showing change in resistance of the second giant magnetoresistance element shown in FIG. 6 with external magnetic field.
Figure 10B:
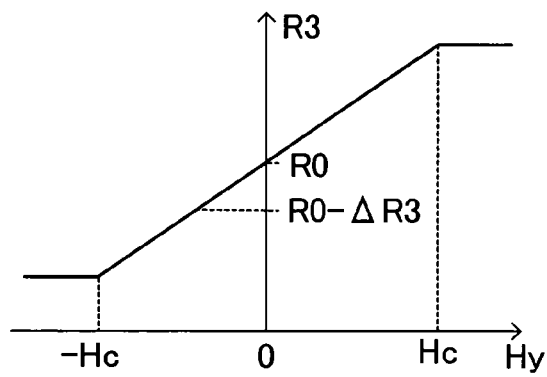
FIG. 10B is a graph showing change in resistance of the third giant magnetoresistance element shown in FIG. 6 with external magnetic field.
Figure 10C:
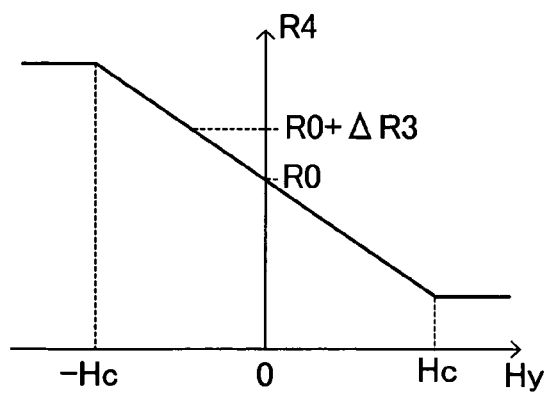
FIG. 10C is a graph showing change in resistance of the fourth giant magnetoresistance element shown in FIG. 6 with external magnetic field.

As a result, the second giant magnetoresistance element 32 has a resistance R2 which increases as the magnitude of the component Hx of an external magnetic field in the X-axis positive direction increases, as shown in FIG. 10A. The third giant magnetoresistance element 33 has a resistance R3 which increases as the magnitude of the component Hy of an external magnetic field in the Y-axis positive direction increases, as shown in FIG. 10B. The fourth giant magnetoresistance element 34 has a resistance R4 which decreases as the magnitude of the component Hy of an external magnetic field in the Y-axis positive direction increases, as shown in FIG. 10C.

As shown in FIG. 11, the magnet position determining portion 35 is connected to the first through fourth giant magnetoresistance element 31 to 34. The magnet position determining portion 35 includes a lookup table 35a which stores the relation between combination of resistances (R1, R2, R3, and R4) of the first through fourth giant magnetoresistance element 31 to 34 and position (X-Y) of the magnet 13. The magnet position determining portion 35 measures the respective resistances of the first through fourth giant magnetoresistance element 31 to 34, and temporarily stores their measured values. Subsequently, the magnet position determining portion 35 determines the position (X-Y) of the magnet 13 on the basis of the lookup table 35a and actual values of the resistances R1 to R4 of the first through fourth giant magnetoresistance element 31 to 34, and outputs a signal indicating the determined magnet position.

<Operation>

Operation of the pointing device 10 (magnetic sensor 20) having the above-described structure (a method for detecting the position of the magnet 13) will be described with reference to FIGS. 12 and 13.

Figure 12:
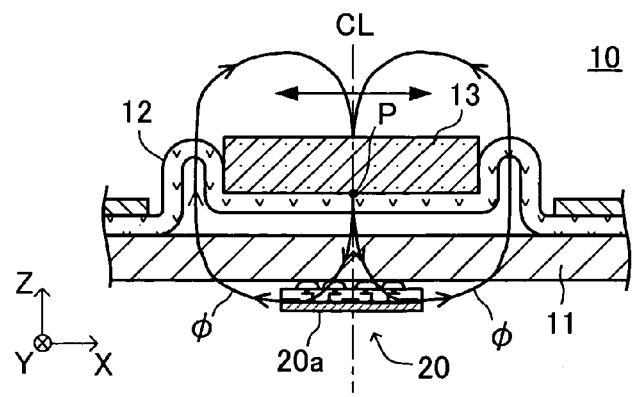
FIG. 12 is a view showing magnetic lines of force of magnetic fields detected by the magnetic sensor shown in FIG. 3.

As shown in FIG. 12, the magnetic sensor 20 (first through fourth giant magnetoresistance elements 31 to 34) detects the horizontal component of the magnetic fields generated by the magnet 13 (a component perpendicular to the magnetization axis, which is a straight line connecting the magnetization center of one magnetic pole and the magnetization center of the other magnetic pole). As described above, the magnetic fields (magnetic lines of force; magnetic flux) generated by the magnet 13 extend radially from the center P of magnetization of the magnet 13 around the center axis (magnetization axis) of the magnet 13 (see FIG. 4).

Figure 13:
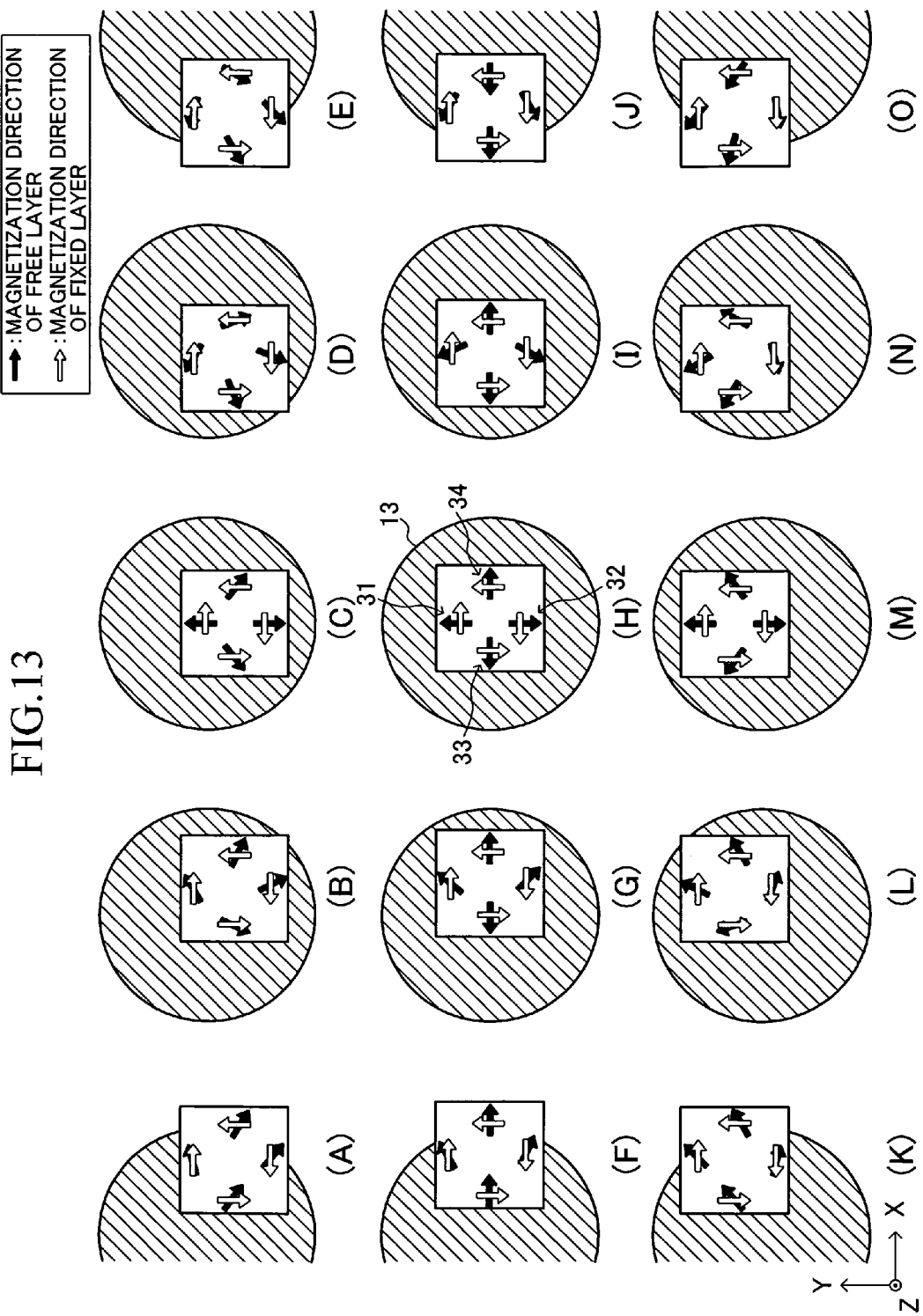
FIG. 13 shows the magnetization directions of the fixed layer and free layer of each giant magnetoresistance element for each of cases in which the magnet and the magnetic sensor shown in FIG. 3 have different relative positional relations, respectively.

Accordingly, as shown in FIG. 13, the magnetization direction of the free layer changes depending on the position of the magnet 13. FIG. 13 includes a plurality of schematic plan views showing the magnetization directions of the fixed layer and free layer of each of the giant magnetoresistance elements 31 to 34 for cases in which the magnet 13 and the magnetic sensor 20 (substrate 21) have different relative positional relations, respectively.

Specifically, when the magnet 13 is located at the initial position, the magnetization direction of the fixed layer and the magnetic direction of the free layer are as shown in (H). In this case, the magnetization direction of the free layer of the first giant magnetoresistance element 31 coincides with the Y-axis positive direction. The magnetization direction of the free layer of the second giant magnetoresistance element 32 coincides with the Y-axis negative direction. The magnetization direction of the free layer of the third giant magnetoresistance element 33 coincides with the X-axis negative direction. The magnetization direction of the free layer of the fourth giant magnetoresistance element 34 coincides with the X-axis positive direction.

As a result, in each giant magnetoresistance element, the magnetization direction of the fixed layer and the magnetization direction of the free layer perpendicularly intersect each other (form an angle of 90° therebetween). Therefore, the giant magnetoresistance elements have respective values R0 shown in FIGS. 9B, 10A, 10B, and 10C, respectively. Accordingly, the magnet position determining portion 35 shown in FIG. 11 determines that the magnet 13 is located at the initial position (origin; i.e., (X,Y)=(0,0)), by referring to the above-described table 35a.

As described above, in the magnetic sensor 20, when the magnet 13 is located at the initial position, the horizontal magnetic fields of the magnet 13 coincide with the initial magnetization directions of the respective free layers of the giant magnetoresistance elements. Accordingly, it becomes unnecessary to form bias magnet films at the opposite ends of the narrow strip portions of each free layer, which bias magnet films would otherwise be required to form in order to return the magnetization of each free layer to the initial state. As a result, the magnetic sensor 20 can be provided less expensively.

Next, the magnet 13 is assumed to have been moved from the position shown in (H) toward the X-axis positive direction as shown in (I). In this case, the magnetization direction of the free layer of the first giant magnetoresistance element 31 rotates counterclockwise from the Y-axis positive direction by an angle θ1, and the magnetization direction of the free layer of the second giant magnetoresistance element 32 rotates clockwise from the Y-axis negative direction by the angle θ1.

Accordingly, the angle formed between the magnetization direction of the fixed layer of the first giant magnetoresistance element 31 and the magnetization direction of the free layer thereof becomes an obtuse angle of 90°+θ1. Therefore, as shown in FIG. 9B, the resistance R1 of the first giant magnetoresistance element 31 assumes a value R0+ΔR1 (ΔR1>0). Meanwhile, the angle formed between the magnetization direction of the fixed layer of the second giant magnetoresistance element 32 and the magnetization direction of the free layer thereof becomes an acute angle of 90°−θ1. Therefore, as shown in FIG. 10A, the resistance R2 of the second giant magnetoresistance element 32 assumes a value R0−ΔR1.

In contrast, the angle formed between the magnetization direction of the fixed layer of the third giant magnetoresistance element 33 and the magnetization direction of the free layer thereof and the angle formed between the magnetization direction of the fixed layer of the fourth giant magnetoresistance element 34 and the magnetization direction of the free layer thereof are maintained at 90°. Accordingly, both the resistance R3 of the third giant magnetoresistance element 33 and the resistance R4 of the fourth giant magnetoresistance element 34 are still R0.

In this case, the magnet position determining portion 35 shown in FIG. 11 searches the table 35a for the case where the resistances of the first through fourth giant magnetoresistance elements are R0+ΔR1, R0−ΔR1, R0, and R0, respectively, to thereby determine that the magnet 13 is located at a certain position on the X-axis (i.e., (X,Y)=(X1,0); X1>0).

Next, the magnet 13 is assumed to have been moved further from the position shown in (I) toward the X-axis positive direction, as shown in (J). In this case, the magnetization direction of the free layer of the first giant magnetoresistance element 31 rotates counterclockwise from the Y-axis positive direction by an angle θ2 (>θ1), and the magnetization direction of the free layer of the second giant magnetoresistance element 32 rotates clockwise from the Y-axis negative direction by the angle θ2.

Accordingly, the angle formed between the magnetization direction of the fixed layer of the first giant magnetoresistance element 31 and the magnetization direction of the free layer thereof becomes an obtuse angle of 90°+θ2. Therefore, as shown in FIG. 9B, the resistance R1 of the first giant magnetoresistance element 31 assumes a value R0+ΔR2 (ΔR2>ΔR1). Meanwhile, the angle formed between the magnetization direction of the fixed layer of the second giant magnetoresistance element 32 and the magnetization direction of the free layer thereof becomes an acute angle of 90°−θ2. Therefore, as shown in FIG. 10A, the resistance R2 of the second giant magnetoresistance element 32 assumes a value R0−ΔR2.

In contrast, the angle formed between the magnetization direction of the fixed layer of the third giant magnetoresistance element 33 and the magnetization direction of the free layer thereof and the angle formed between the magnetization direction of the fixed layer of the fourth giant magnetoresistance element 34 and the magnetization direction of the free layer thereof are maintained at 90°. Accordingly, both the resistance R3 of the third giant magnetoresistance element 33 and the resistance R4 of the fourth giant magnetoresistance element 34 are still R0.

In this case, the magnet position determining portion 35 shown in FIG. 11 searches the table 35a for the case where the resistances of the first through fourth giant magnetoresistance elements are R0+ΔR2, R0−ΔR2, R0, and R0, respectively, to thereby determines that the magnet 13 is located at a certain position on the X-axis (i.e., (X,Y)=(X2,0); X2>X1).

Next, the magnet 13 is assumed to have been moved from the position shown in (H) toward the Y-axis positive direction as shown in (C). In this case, the magnetization direction of the free layer of the third giant magnetoresistance element 33 rotates counterclockwise from the X-axis negative direction by an angle θ3, and the magnetization direction of the free layer of the fourth giant magnetoresistance element 34 rotates clockwise from the X-axis positive direction by an angle θ3.

Accordingly, the angle formed between the magnetization direction of the fixed layer of the third giant magnetoresistance element 33 and the magnetization direction of the free layer thereof becomes an acute angle of 90°−θ3. Therefore, as shown in FIG. 10B, the resistance R3 of the third giant magnetoresistance element 33 assumes a value R0−ΔR3 (ΔR3>0). Meanwhile, the angle formed between the magnetization direction of the fixed layer of the fourth giant magnetoresistance element 34 and the magnetization direction of the free layer thereof becomes an obtuse angle of 90°+θ3. Therefore, as shown in FIG. 10C, the resistance R4 of the fourth giant magnetoresistance element 34 assumes a value R0+ΔR3.

In contrast, the angle formed between the magnetization direction of the fixed layer of the first giant magnetoresistance element 31 and the magnetization direction of the free layer thereof and the angle formed between the magnetization direction of the fixed layer of the second giant magnetoresistance element 32 and the magnetization direction of the free layer thereof are maintained at 90°. Accordingly, both the resistance R1 of the first giant magnetoresistance element 31 and the resistance R2 of the second giant magnetoresistance element 32 are still R0.

In this case, the magnet position determining portion 35 shown in FIG. 11 searches the table 35a for the case where the resistances of the first through fourth giant magnetoresistance elements are R0, R0, R0−ΔR3, and R0+ΔR3, respectively, to thereby determine that the magnet 13 is located at a certain position on the Y-axis (i.e., (X,Y)=(0,Y1); Y1>0).

As can be understood from the above, the angles formed between the magnetization directions of the fixed layers of the first through fourth giant magnetoresistance elements 31 to 34 and the magnetization directions of the free layers thereof change depending on the position of the magnet 13. In other words, the resistances (R1, R2, R3, and R4) of the first through fourth giant magnetoresistance elements 31 to 34 change depending on the position of the magnet 13. Therefore, the magnet position determining portion 35 determines the position (X,Y) of the magnet 13 on the basis of the lookup table 35a and actual values of the resistances (R1, R2, R3, and R4) of the first through fourth giant magnetoresistance elements 31 to 34.

<Method for Manufacturing the Magnetic Sensor 20 and Method for Fixing the Magnetization of the Fixed Layer>

Figure 14:
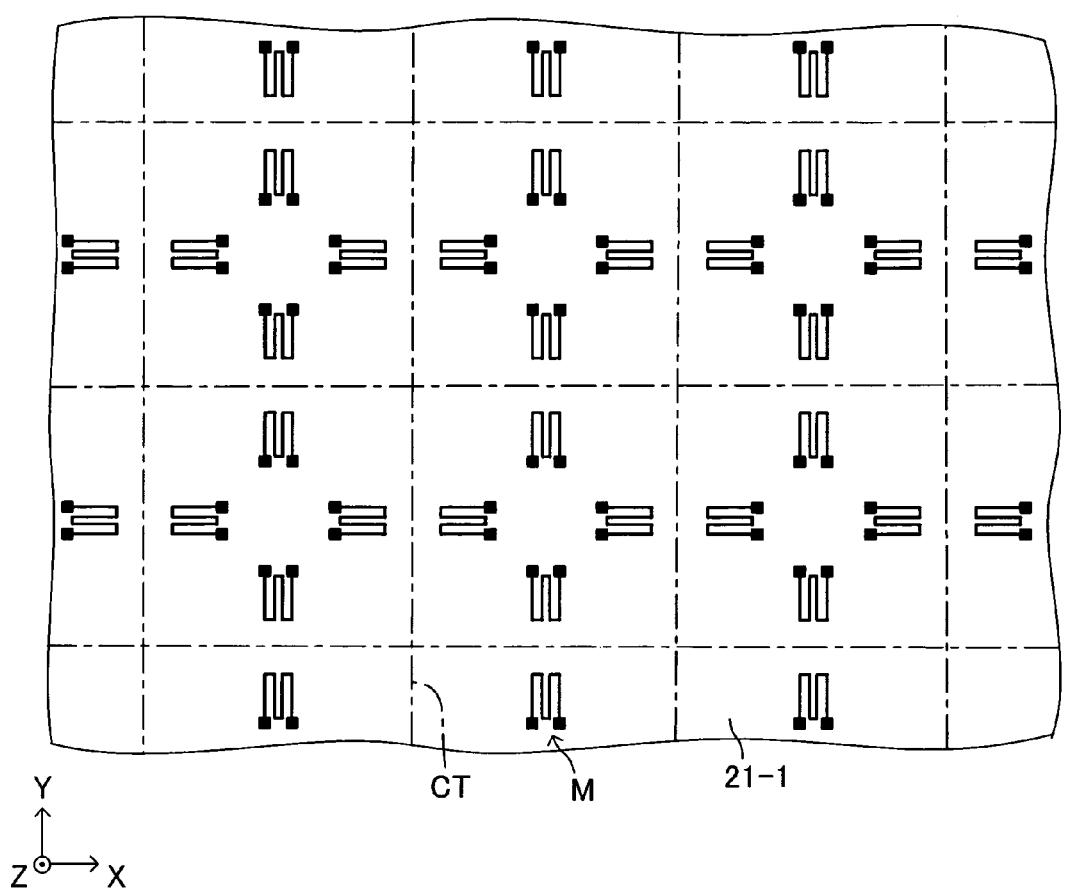
FIG. 14 is a partial plan view of a wafer (substrate) used for manufacturing the magnetic sensor shown in FIG. 3.

Next, there will be described a method for manufacturing the magnetic sensor 20; in particular, a method for fixing the magnetization of the fixed layer of each of the first through fourth giant magnetoresistance elements 31 to 34. First, as shown in FIG. 14, which is a plan view, a plurality of island-shaped films M which constitute the first through fourth giant magnetoresistance elements 31 to 34 are formed on a substrate 21-1, which is to become the substrate 21. These films M are formed in such a manner that when the substrate 21-1 is cut by a subsequent cutting step along cutting lines CT indicated by alternate long and short dash lines in FIG. 14 and is divided into the substrate 21 of the individual magnetic sensor 20 shown in FIG. 6, the elements 31 to 34 are disposed at the respective positions on the substrate 21 shown in FIG. 6.

Figure 15:
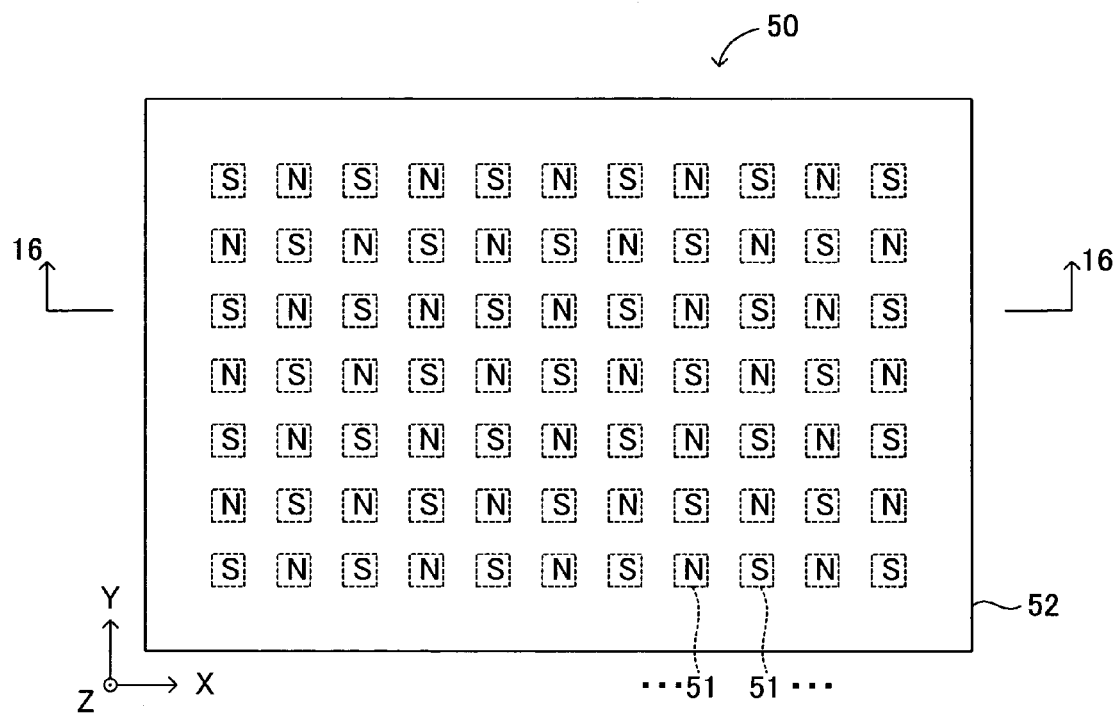
FIG. 15 is a plan view of a magnet array used to fix the magnetization direction of the fixed layer (pined layer of the fixed layer) of the magnetic sensor shown in FIG. 3.
Figure 16:
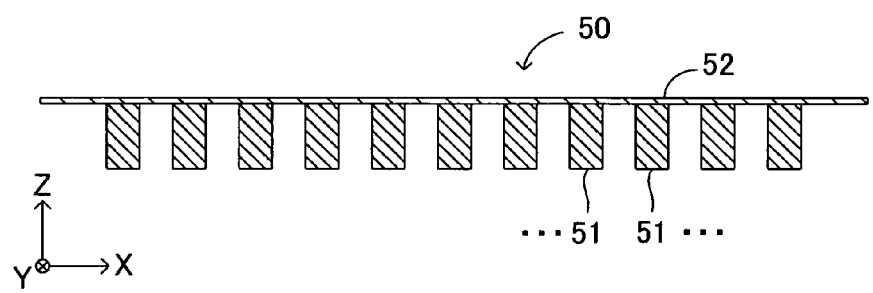
FIG. 16 is a sectional view of the magnet array taken along line 16-16 of FIG. 15.

Next, a magnet array 50 shown in FIGS. 15 and 16 is prepared. FIG. 15 is a plan view of the magnet array 50. FIG. 16 is a sectional view of the magnet array 50 taken along line 16-16 of FIG. 15. This magnet array 50 includes a plurality of permanent magnets (permanent bar magnets) 51 each assuming the shape of a parallelepiped, and a plate 52 formed of transparent quartz glass. The permanent magnets 51 are arranged in a square grid pattern, and the upper end surfaces thereof are fixed to the lower surface of the plate 52. The permanent magnets 51 are arranged in such a manner that within a plane including the end surfaces of the permanent magnets 51, immediately adjacent magnetic poles have different polarities.

That is, in the magnet array 50, the plurality of permanent magnets 51 each assuming a generally parallelepipedic shape and having a generally square cross section taken perpendicular to the center axis of the parallelepiped are disposed such that the centroids of the generally square end surfaces of the permanent magnets 51 coincide with the lattice points of a square lattice and that the magnetic pole of a certain permanent magnet 51 is opposite in polarity to the magnetic pole of another permanent magnet 51 located immediately adjacent to the certain permanent magnet 51.

Figure 17:
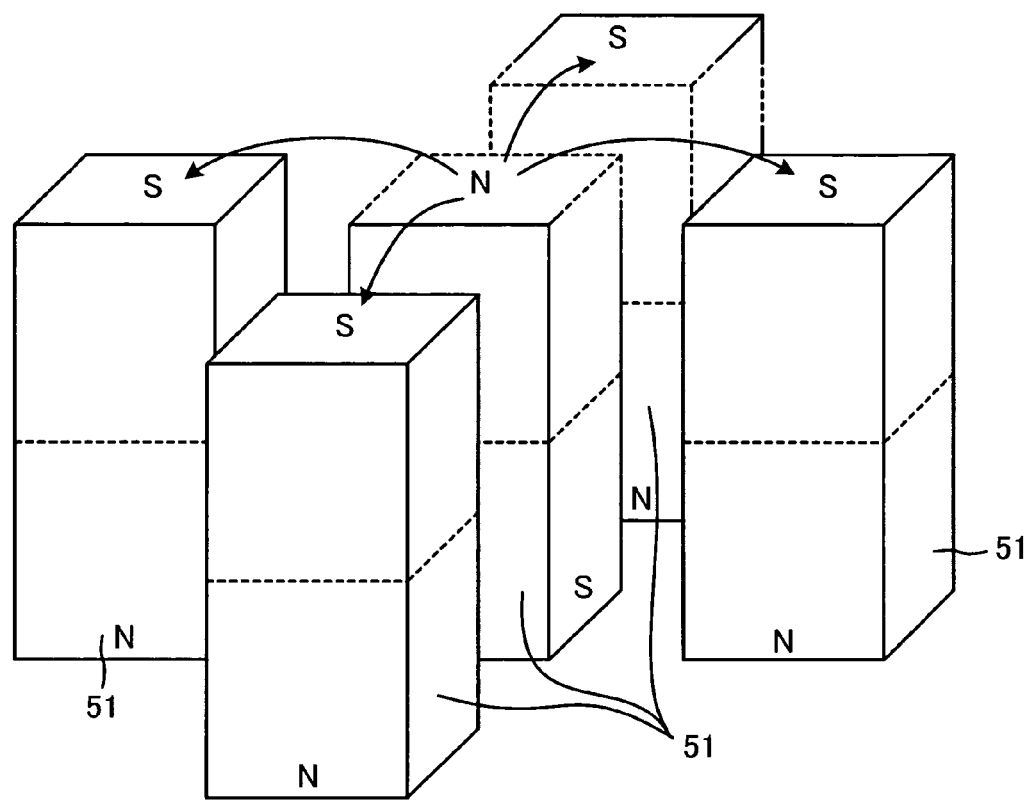
FIG. 17 is a perspective view of five permanent magnets of the permanent magnets of the magnet array shown in FIG. 15.

FIG. 17 is a perspective view of five permanent magnets 51 chosen from the above-described permanent magnets 51. As is apparent from this drawing, at the end surface of a certain permanent magnet 51 (end surface on which the magnetic pole (N pole in this example) is formed), there are produced different magnetic fields which extend from the N pole in four different directions 90° apart from one another and reach S poles immediately adjacent to the N pole. In the present embodiment, these magnetic fields are used to fix the magnetization directions of the pinned layers of the first through fourth giant magnetoresistance element 31 to 34.

Next, the substrate 21-1 carrying the films M is placed on the magnet array 50. At this time, the relative position of the substrate 21 with respect to the magnet array 50 is determined such that, as shown by a plan view of FIG. 18, the corners of each of squares formed as a result of cutting the substrate 21-1 along the cutting lines CT coincide with the centers of the respective end surfaces of four magnets 51 adjacent to one another. As a result, as indicated by an arrow in FIG. 18, a magnetic field is applied to each film M in the direction perpendicular to the longitudinal direction of the narrow strip portions of the film M.

Subsequently, a heat treatment is performed in a magnetic field, whereby the substrate 21-1 and the magnet array 50 in a combined state are heated to 250° C. to 280° C. under vacuum, and then allowed to stand for about 4 hours. With this process, the magnetization direction of the fixed layer P (pined layer Pd) is fixed.

Figure 18:
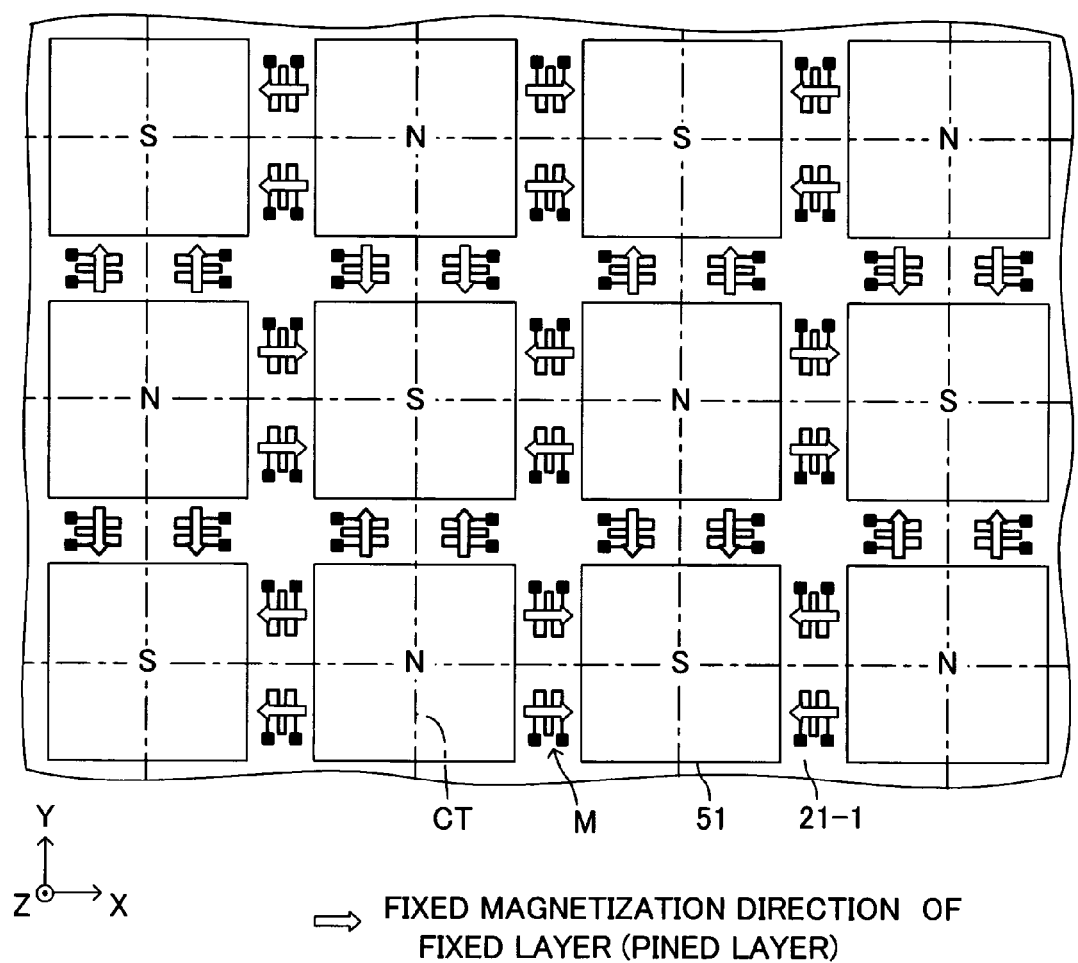
FIG. 18 is a partial plan view of the magnet array and the wafer for showing a method of fixing the magnetization directions of the pined layers of the giant magnetoresistance elements of the magnetic sensor shown in FIG. 3.

After that, predetermined necessary treatments are performed, and the substrate 21-1 is cut along the cutting lines CT shown in FIG. 18. As a result, a large number of magnetic sensors 20 are manufactured simultaneously.

As described above, the magnetic sensor according to the embodiment of the present invention has the following features.

(1) The magnetic sensor includes at least two (preferably, at least four) giant magnetoresistance elements provided on the main surface of the substrate 21.

(2) Of the giant magnetoresistance elements, at least two (preferably, at least four) giant magnetoresistance elements differ from each other in terms of the fixed magnetization direction of the fixed layer (e.g., a 90° angle difference being present between the magnetization directions of the fixed layers of two adjacent giant magnetoresistance elements). In other words, the fixed magnetization directions of the fixed layers of the elements intersect each other.

(3) The fixed magnetization directions of the fixed layers of the least two (preferably, at least four) giant magnetoresistance elements perpendicularly intersect horizontal magnetic fields generated by the magnet 13 when the magnet 13 is located at the initial position.

(4) The magnetization directions of the free layers of the least two (preferably, at least four) giant magnetoresistance elements are parallel to horizontal magnetic fields generated by the magnet 13 when the magnet 13 is located at the initial position.

Since the magnetic sensor 20 detects the position of the magnet 13 on the basis of the directions of horizontal magnetic fields of the magnet 13, the magnetic sensor 20 can be used as a magnetic sensor for a pointing device which is small, which has a reduced restriction on the layout of the magnet 13 and the giant magnetoresistance elements, and which can accurately detect the position of the magnet 13.

The present invention is not limited to the above-described embodiment, and various modifications thereof may be employed without departing the scope of the present invention. For example, the magnetic sensor 20 of the above-described embodiment includes four giant magnetoresistance elements; i.e., the first giant magnetoresistance element 31 to the fourth giant magnetoresistance element 34; however, the magnetic sensor 20 may include two giant magnetoresistance elements; i.e., the first giant magnetoresistance element 31 and the third giant magnetoresistance element 33.

In this case, a combination (R1, R3) of the resistance R1 of the first giant magnetoresistance element (one giant magnetoresistance element) 31 and the resistance R3 of the third giant magnetoresistance element (the other giant magnetoresistance element) 33 is peculiar to a certain position of the magnet 13. Accordingly, the position of the magnet 13 can be detected from the combination of the resistances R1 and R3. Further, the magnetization directions of the fixed layers of the first giant magnetoresistance element 31 and the third giant magnetoresistance element 33 are not necessarily required to intersect each other perpendicularly, so long as the magnetization directions of the fixed layers of these elements intersect each other. Notably, the term "intersect" does not encompass "parallel" and "antiparallel."

Figure 19:
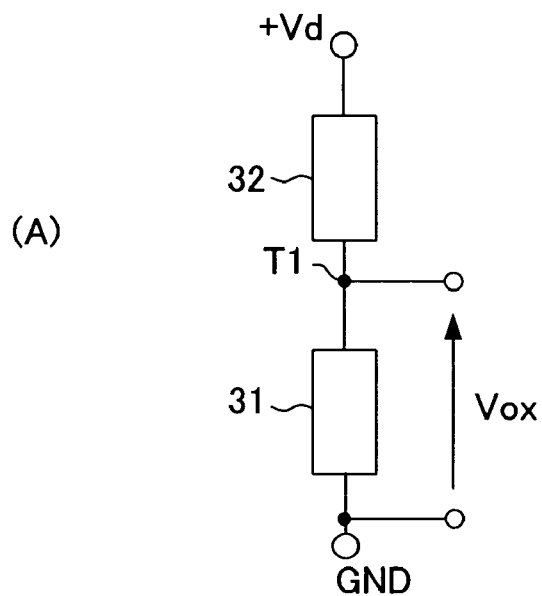
FIG. 19A is a circuit diagram showing a modification of the magnetic sensor according to the present invention.
FIG. 19B is a graph showing the output characteristic of the magnetic sensor shown in FIG. 19A.
Figure 19:
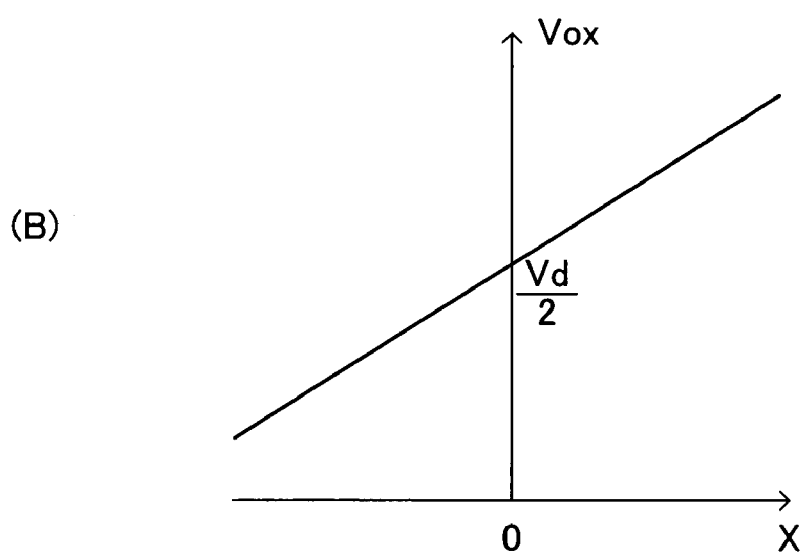

Moreover, the magnetic sensor 20 may be configured such that the magnet 13 is supported on the mounting substrate 11 to be movable along the X-axis direction only, only the first giant magnetoresistance element 31 and the second giant magnetoresistance element 32 are formed on the substrate 21 and connected to form a half bridge circuit as shown in FIG. 19A so as to detect the position of the magnet 13 along the X-axis direction. FIG. 19B is a graph showing the output characteristic of such a sensor.

Figure 20A:
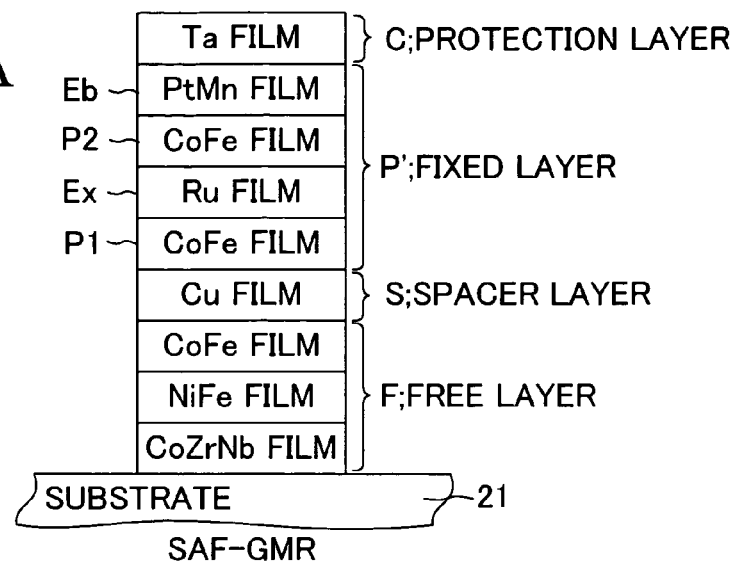
FIG. 20A is an illustration showing the layer structure of an SAF element according to another modification of the magnetic sensor of the present invention.

Each of the giant magnetoresistance elements may be replaced with a giant magnetoresistance element composed of a synthetic spin valve film (hereinafter called an "SAF element") shown in FIG. 20A. This synthetic spin valve film includes a free layer F formed on the substrate 21; a spacer layer S formed on the free layer F; a fixed layer P' formed on the spacer layer S; and a protection layer (capping layer) C formed on the fixed layer P'.

The free layer F, spacer layer S, and protection layer C of the synthetic spin valve film have the same structures as those of the ordinary spin valve film shown in FIG. 9A. That is, only the fixed layer P' of the synthetic spin valve film differs from the fixed layer P of the ordinary spin valve film.

The fixed layer P' is a multi-layer fixed layer including a first ferromagnetic film P1 made of CoFe; an exchange-coupling film Ex laminated on the first ferromagnetic film P1 and made of Ru; a second ferromagnetic film P2 laminated on the exchange-coupling film Ex and made of CoFe; and an exchange bias film (antiferromagnetic film) Eb laminated on the second ferromagnetic film P2 and made of a PtMn alloy that contains Pt in an amount of 45 mol % to 55 mol %.

The exchange-coupling film Ex is sandwiched between the first ferromagnetic film P1 and the second ferromagnetic film P2. The first ferromagnetic film P1, the exchange-coupling film Ex, and the second ferromagnetic film P2 constitute a pinned layer whose magnetization direction is pinned in a fixed direction so that the magnetization direction does not vary with a variation in an external magnetic field. The exchange bias film Eb constitutes a pinning layer for pinning the magnetization direction of the first ferromagnetic film (pinned layer) P1 via the second ferromagnetic film P2 and the exchange-coupling film Ex. Notably, the first ferromagnetic film P1, the exchange-coupling film Ex, and the second ferromagnetic film P2 may be called a "pinned layer."

Figure 20B:
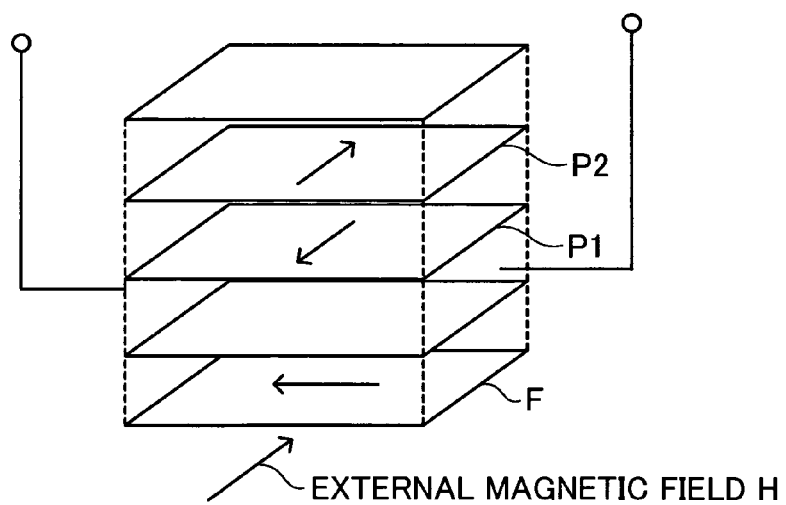
FIG. 20B is a schematic perspective view of the SAF element shown in FIG. 20A.

The exchange bias film Eb exchange-couples with the second ferromagnetic film P2 and fixes to a predetermined direction the direction of magnetization (magnetization vector) of the second ferromagnetic film P2. The first ferromagnetic film P1 and the second ferromagnetic film P2 exchange-couple with each other via the exchange-coupling film Ex. At this time, as indicted by arrows in FIG. 20B, the magnetization directions of the first ferromagnetic film P1 and the second ferromagnetic film P2 are antiparallel with each other.

Figure 20C:
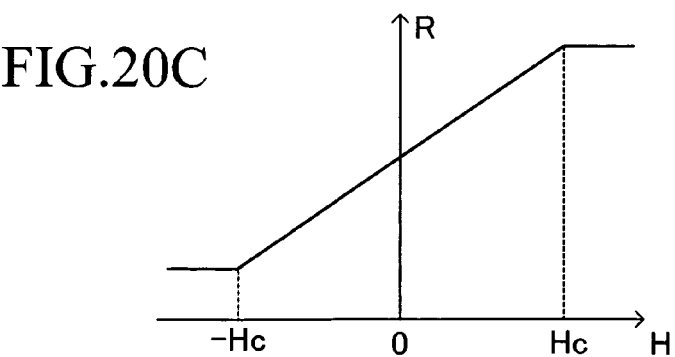
FIG. 20C is a graph showing change in resistance of the SAF element shown in FIG. 20A with external magnetic field.
Figure 21:
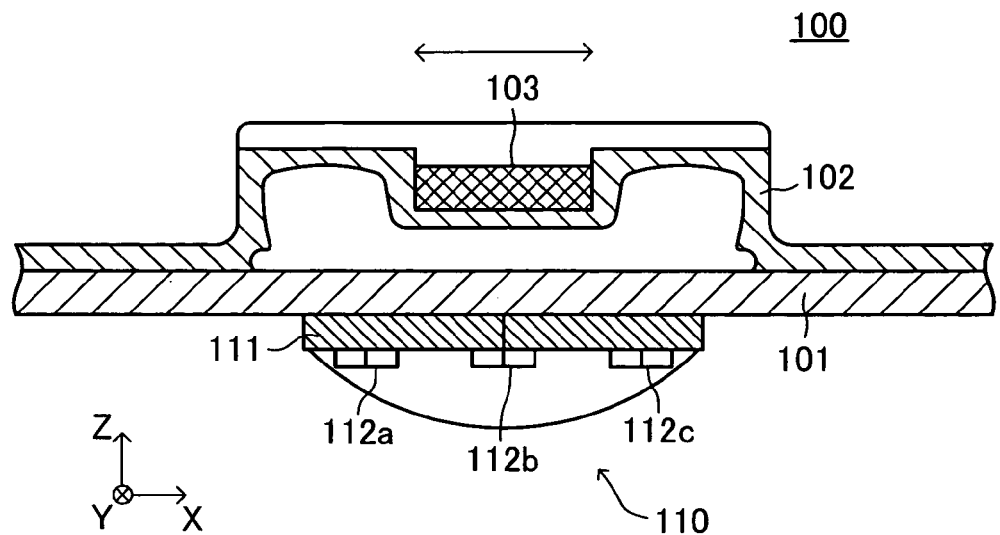
FIG. 21 is a sectional view of a conventional pointing device.
Figure 22:
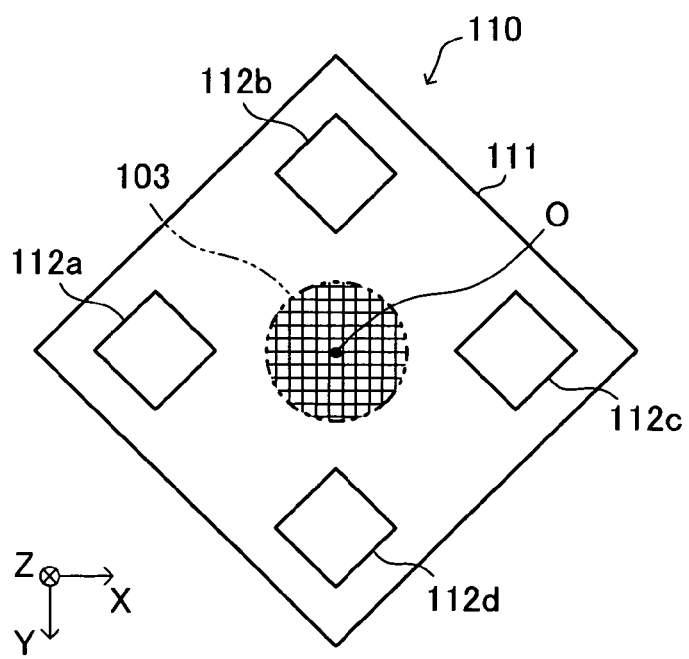
FIG. 22 is a plan view of the magnetic sensor shown in FIG. 21.
Figure 23:
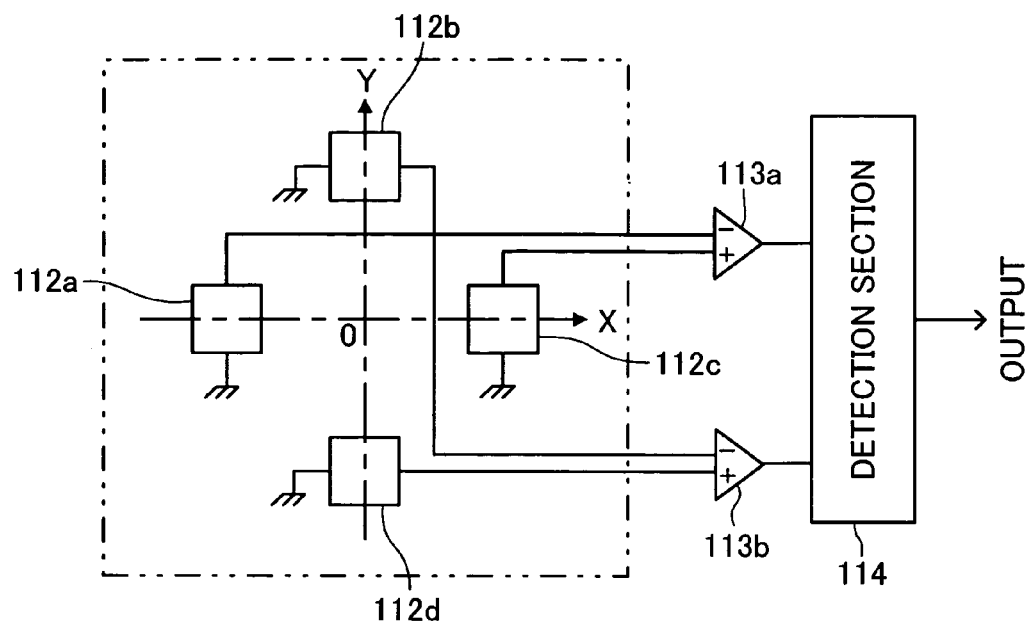
FIG. 23 is a circuit diagram of the magnetic sensor shown in FIG. 21.
Figure 24:
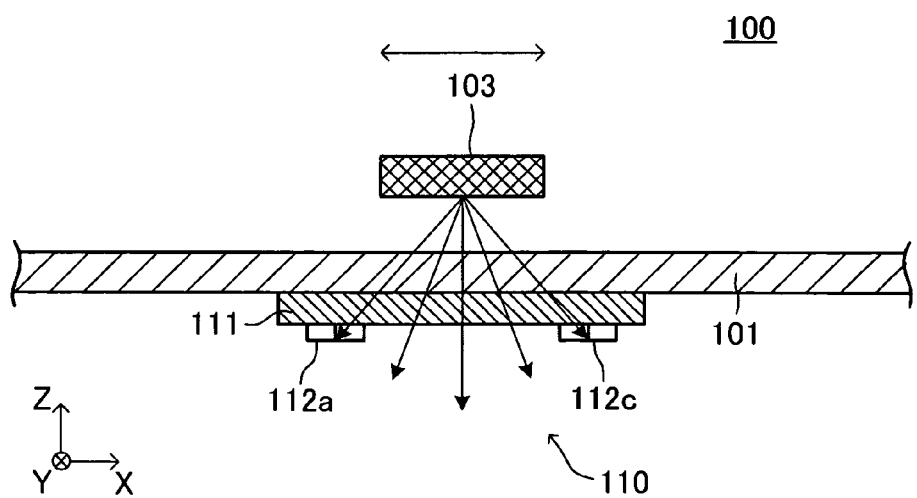
FIG. 24 is a schematic sectional view used for explaining the operation of the magnetic sensor shown in FIG. 21.
Figure 25:
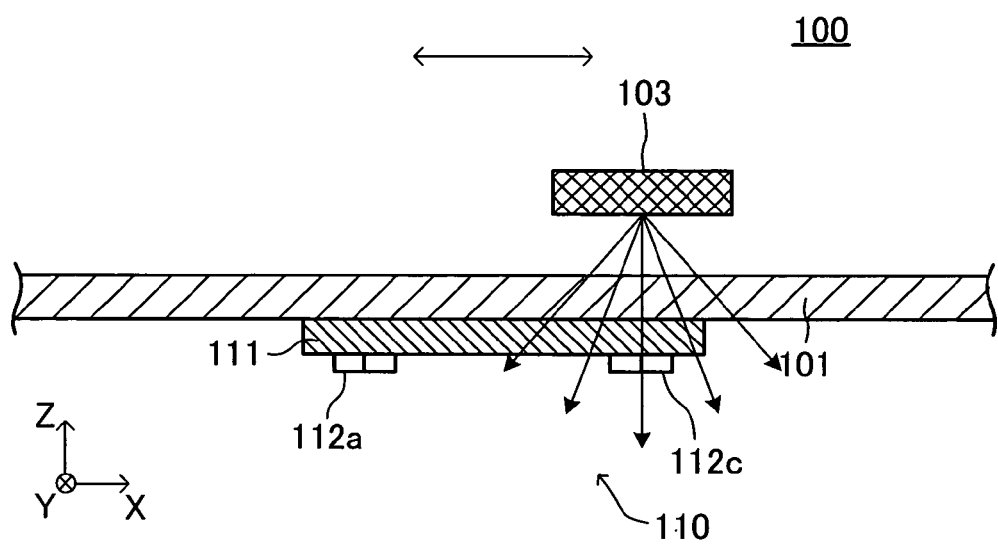
FIG. 25 is another schematic sectional view used for explaining the operation of the magnetic sensor shown in FIG. 21.

As shown in FIG. 20C, within the range of −Hc to +Hc, the SAF element configured as described above exhibits a resistance which changes with an external magnetic field H which changes along the fixed magnetization direction of the first ferromagnetic film P1 (pinned layer) of the fixed layer P'.

What is claimed is:

1. A magnetic sensor for a pointing device which detects a position of a magnet supported on a mounting substrate such that when an external operation force is applied to the magnet, the magnet moves from a predetermined initial position, the movement including a component parallel to a main surface of the substrate, wherein a straight line connecting the magnetization center of one magnetic pole of the magnet and the magnetization center of the other magnetic pole thereof perpendicularly intersects the main surface of the mounting substrate when the magnet is located at the initial position, the magnetic sensor comprising:

a first giant magnetoresistance element which is fixedly secured to the mounting substrate such that the layer plane of a fixed layer thereof is parallel to the main surface of the mounting substrate, and the magnetization direction of the fixed layer coincides with a predetermined first direction, and is configured such that when the magnet is located at the initial position, the magnetization direction of a free layer of the element coincides with a direction which differs from the first direction by 90 degrees;

a second giant magnetoresistance element which is fixedly secured to the mounting substrate such that the layer plane of a fixed layer thereof is parallel to the main surface of the mounting substrate, and the magnetization direction of the fixed layer coincides with a second direction, which is opposite to the first direction, and is configured such that when the magnet is located at the initial position, the magnetization direction of a free layer of the element coincides with a direction which differs from the second direction by 90 degrees;

a third giant magnetoresistance element which is fixedly secured to the mounting substrate such that the layer plane of a fixed layer thereof is parallel to the main surface of the mounting substrate, and the magnetization direction of the fixed layer coincides with a third direction which differs from the first direction by 90 degrees, and is configured such that when the magnet is located at the initial position, the magnetization direction of a free layer of the element coincides with a direction which differs from the third direction by 90 degrees; and a fourth giant magnetoresistance element which is fixedly secured to the mounting substrate such that the layer plane of a fixed layer thereof is parallel to the main surface of the mounting substrate, and the magnetization direction of the fixed layer coincides with a fourth direction, which is opposite the third direction, and is configured such that when the magnet is located at the initial position, the magnetization direction of a free layer of the element coincides with a direction which differs the fourth direction by 90 degrees, wherein the position of the magnet is detected on the basis of resistances of the first through fourth giant magnetoresistance elements.

2. A magnetic sensor according to claim 1, wherein the first through fourth giant magnetoresistance elements are formed on a single substrate.

3. A magnetic sensor according to claim 2, wherein the first through fourth giant magnetoresistance elements are disposed at corner portions of a single rhombus; a line connecting the first giant magnetoresistance element and the second giant magnetoresistance element forms one diagonal of the rhombus; and a line connecting the third giant magnetoresistance element and the fourth giant magnetoresistance element forms the other diagonal of the rhombus.

4. A magnetic sensor according to claim 3, wherein the rhombus is a square.

5. A magnetic sensor according to claim 4, wherein when the magnet is located at the initial position, a straight line which connects the magnetization center of one magnetic pole of the magnet and the magnetization center of the other magnetic pole thereof passes through the centroid of the square.

6. A magnetic sensor according to claim 1, wherein the first through fourth giant magnetoresistance elements are disposed at corner portions of a single rhombus; a line connecting the first giant magnetoresistance element and the second giant magnetoresistance element forms one diagonal of the rhombus; and a line connecting the third giant magnetoresistance element and the fourth giant magnetoresistance element forms the other diagonal of the rhombus.

7. A magnetic sensor according to claim 6, wherein the rhombus is a square.

8. A magnetic sensor according to claim 7, wherein when the magnet is located at the initial position, a straight line which connects the magnetization center of one magnetic pole of the magnet and the magnetization center of the other magnetic pole thereof passes through the centroid of the square.

9. A magnetic sensor for a pointing device which detects a position of a magnet supported on a mounting substrate such that when an external operation force is applied to the magnet, the magnet moves from a predetermined initial position, the movement including a component parallel to a main surface of the substrate, wherein a straight line connecting the magnetization center of one magnetic pole of the magnet and the magnetization center of the other magnetic pole thereof perpendicularly intersects the main surface of the mounting substrate when the magnet is located at the initial position, the magnetic sensor comprising:

a first giant magnetoresistance element which is fixedly secured to the mounting substrate such that the layer plane of a fixed layer thereof is parallel to the main surface of the mounting substrate, and the magnetization direction of the fixed layer coincides with a predetermined first direction, and is configured such that when the magnet is located at the initial position, the magnetization direction of a free layer of the element coincides with a direction which differs from the first direction by 90degrees;

a third giant magnetoresistance element which is fixedly secured to the mounting substrate such that the layer plane of a fixed layer thereof is parallel to the main surface of the mounting substrate, and the magnetization direction of the fixed layer coincides with a third direction which differs from the first direction by 90 degrees, and is configured such that when the magnet is located at the initial position, the magnetization direction of a free layer of the element coincides with a direction which differs from the third direction by 90 degrees; and position determining section which determines the position of the magnet on the basis of resistances of the first and the third giant magnetoresistance elements.

10. A magnetic sensor according to claim 9 , further comprising, a second giant magnetoresistance element which is fixedly secured to the mounting substrate such that the layer plane of a fixed layer thereof is parallel to the main surface of the mounting substrate, and the magnetization direction of the fixed layer coincides with a second direction, which is opposite to the first direction, and is configured such that when the magnet is located at the initial position, the magnetization direction of a free layer of the element coincides with a direction which differs from the second direction by 90 degrees;and a fourth giant magnetoresistance element which is fixedly secured to the mounting substrate such that the layer plane of a fixed layer thereof is parallel to the main surface of the mounting substrate, and the magnetization direction of the fixed layer coincides with a fourth direction, which is opposite the third direction, and is configured such that when the magnet is located at the initial position, the magnetization direction of a free layer of the element coincides with a direction which differs the fourth direction by 90 degrees, wherein the position determining section determines the position of the magnet on the basis of resistances of the first through fourth giant magnetoresistance elements.

11. A magnetic sensor according to claim 10, wherein the first through fourth giant magnetoresistance elements are formed on a single substrate.

12. A magnetic sensor according to claim 10, wherein the position determining section includes a lookup table which stores the relation between combination of resistances of the first through fourth giant magnetoresistance elements and the position of the magnet.

13. A magnetic sensor according to claim 12, wherein the first through fourth giant magnetoresistance elements are formed on a single substrate.

14. A magnetic sensor according to claim 12, wherein the first through fourth giant magnetoresistance elements are disposed at corner portions of a single rhombus; a line connecting the first giant magnetoresistance element and the second giant magnetoresistance element forms one diagonal of the rhombus; and a line connecting the third giant magnetoresistance element and the fourth giant magnetoresistance element forms the other diagonal of the rhombus.

15. A magnetic sensor according to claim 14, wherein the rhombus is a square.

16. A magnetic sensor according to claim 15, wherein when the magnet is located at the initial position, a straight line which connects the magnetization center of one magnetic pole of the magnet and the magnetization center of the other magnetic pole thereof passes through the centroid of the square.

17. A magnetic sensor according to claim 10, wherein the first through fourth giant magnetoresistance elements are disposed at corner portions of a single rhombus; a line connecting the first giant magnetoresistance element and the second giant magnetoresistance element forms one diagonal of the rhombus; and a line connecting the third giant magnetoresistance element and the fourth giant magnetoresistance element forms the other diagonal of the rhombus.

18. A magnetic sensor according to claim 17, wherein the rhombus is a square.

19. A magnetic sensor according to claim 18, wherein when the magnet is located at the initial position, a straight line which connects the magnetization center of one magnetic pole of the magnet and the magnetization center of the other magnetic pole thereof passes through the centroid of the square.

* * * * *